United States Patent
Luski et al.

(10) Patent No.: US 10,008,749 B2
(45) Date of Patent: Jun. 26, 2018

(54) LITHIUM ION BATTERY

(71) Applicants: GM GLOBAL TECHNOLOGY OPERATIONS LLC, Detroit, MI (US); Bar-Ilan University, Ramat Gan (IL)

(72) Inventors: Shalom Luski, Rehovot (IL); Doron Aurbach, Bnei Brak (IL); Ion C. Halalay, Grosse Pointe Park, MI (US); Timothy J. Fuller, Pittsford, NY (US); Bob R. Powell, Jr., Birmingham, MI (US); Anjan Banerjee, West Bengal State (IN); Baruch Ziv, Ramat-Gan (IL); Yuliya Shilina, Bat Yam (IL)

(73) Assignees: GM GLOBAL TECHNOLOGY OPERATIONS LLC, Detroit, MI (US); BAR-ILAN UNIVERSITY, Ramat Gan (IL)

( * ) Notice: Subject to any disclaimer, the term of this patent is extended or adjusted under 35 U.S.C. 154(b) by 12 days.

(21) Appl. No.: 15/186,525

(22) Filed: Jun. 19, 2016

(65) Prior Publication Data

US 2017/0365882 A1    Dec. 21, 2017

(51) Int. Cl.
*H01M 10/42* (2006.01)
*H01M 4/62* (2006.01)
(Continued)

(52) U.S. Cl.
CPC ....... *H01M 10/4235* (2013.01); *H01M 2/166* (2013.01); *H01M 2/1653* (2013.01);
(Continued)

(58) Field of Classification Search
CPC combination set(s) only.
See application file for complete search history.

(56) References Cited

U.S. PATENT DOCUMENTS

| 4,530,963 A | 7/1985 | DeVoe et al. |
| 4,670,363 A * | 6/1987 | Whitney ............. H01M 10/052 429/199 |

(Continued)

FOREIGN PATENT DOCUMENTS

| CN | 102130361 A | 7/2011 |
| CN | 102447111 A | 5/2012 |

(Continued)

OTHER PUBLICATIONS

Walkowiak, et al., Macrocycle Carriers for Separation of Metal Ions in Liquid Membrane Process—A Review, Desalination 240, 1999, pp. 186-197.

(Continued)

*Primary Examiner* — Carlos Barcena
(74) *Attorney, Agent, or Firm* — Harness, Dickey & Pierce, P.L.C.

(57) ABSTRACT

A lithium ion battery includes positive and negative electrodes, and a nanoporous or microporous polymer separator soaked in an electrolyte solution, between the positive electrode and the negative electrode. Chelating agent(s) are included to complex with transition metal ions while not affecting movement of lithium ions across the separator during operation of the lithium ion battery. The chelating agents are: dissolved in the electrolyte solution; grafted onto the polymer of the separator; attached to the binder material of the negative and/or positive electrode; coated on a surface of the separator; and/or coated on a surface of the negative and/or positive electrode. The chelating agents are selected from: ion traps in molecular form selected from polyamines, thiols and alkali metal salts of organic acids; polymers functionalized with alkali metal salts of organic acids; polymers functionalized with nitrogen-containing functional groups; and polymers functionalized with two or more functional groups.

20 Claims, 11 Drawing Sheets

(51) Int. Cl.
| | |
|---|---|
| *H01M 4/587* | (2010.01) |
| *H01M 4/525* | (2010.01) |
| *H01M 4/505* | (2010.01) |
| *H01M 4/133* | (2010.01) |
| *H01M 4/131* | (2010.01) |
| *H01M 2/16* | (2006.01) |
| *H01M 10/0525* | (2010.01) |

(52) U.S. Cl.
CPC ........... *H01M 4/131* (2013.01); *H01M 4/133* (2013.01); *H01M 4/505* (2013.01); *H01M 4/525* (2013.01); *H01M 4/587* (2013.01); *H01M 4/623* (2013.01); *H01M 4/625* (2013.01); *H01M 10/0525* (2013.01)

(56) References Cited

U.S. PATENT DOCUMENTS

| | | | |
|---|---|---|---|
| 5,130,211 | A | 7/1992 | Wilkinson |
| 6,689,513 | B1 | 2/2004 | Morigaki et al. |
| 7,022,812 | B2 | 4/2006 | Yoshimura et al. |
| 7,282,109 | B2 | 10/2007 | Takata et al. |
| 8,349,031 | B2 | 1/2013 | Take et al. |
| 8,455,140 | B1 | 6/2013 | Huang et al. |
| 8,460,591 | B2 | 6/2013 | Huang et al. |
| 8,460,829 | B1 | 6/2013 | Huang et al. |
| 8,470,468 | B2 | 6/2013 | Xiao et al. |
| 8,470,898 | B2 | 6/2013 | Huang |
| 8,568,930 | B2 | 10/2013 | Halalay et al. |
| 8,663,840 | B2 | 3/2014 | Nazri et al. |
| 8,765,301 | B2 | 7/2014 | Halalay et al. |
| 8,785,054 | B2 | 7/2014 | Halalay et al. |
| 8,835,058 | B2 | 9/2014 | Kia et al. |
| 8,951,654 | B2 | 2/2015 | Sachdev et al. |
| 8,974,946 | B2 | 3/2015 | Cai et al. |
| 8,993,646 | B2 | 3/2015 | Huang |
| 8,999,584 | B2 | 4/2015 | Jiang et al. |
| 9,023,520 | B2 | 5/2015 | Halalay et al. |
| 9,028,565 | B2 | 5/2015 | Huang |
| 9,077,038 | B2 | 7/2015 | Halalay et al. |
| 9,093,705 | B2 | 7/2015 | Xiao et al. |
| 9,123,939 | B2 | 9/2015 | Xiao et al. |
| 9,130,231 | B2 | 9/2015 | Halalay et al. |
| 9,138,932 | B2 | 9/2015 | Huang |
| 9,142,830 | B2 | 9/2015 | Xiao et al. |
| 9,153,819 | B2 | 10/2015 | Huang et al. |
| 9,160,036 | B2 | 10/2015 | Yang et al. |
| 9,172,075 | B2 | 10/2015 | Kia et al. |
| 9,287,540 | B2 | 3/2016 | Huang |
| 9,324,984 | B2 | 4/2016 | Huang et al. |
| 9,331,323 | B2 | 5/2016 | Huang |
| 9,346,066 | B2 | 5/2016 | Huang |
| 9,350,046 | B2 | 5/2016 | Huang |
| 9,362,542 | B2 | 6/2016 | Halalay et al. |
| 9,362,551 | B2 | 6/2016 | Sachdev et al. |
| 9,362,552 | B2 | 6/2016 | Sohn et al. |
| 9,406,971 | B2 | 8/2016 | Kia et al. |
| 9,412,986 | B2 | 8/2016 | Huang |
| 9,455,430 | B2 | 9/2016 | Huang et al. |
| 9,525,600 | B1 | 12/2016 | Shen |
| 9,537,144 | B2 | 1/2017 | Huang et al. |
| 9,799,916 | B2 | 10/2017 | Halalay et al. |
| 2006/0194118 | A1 | 8/2006 | Yew et al. |
| 2010/0143769 | A1 | 6/2010 | Lee et al. |
| 2010/0239900 | A1 | 9/2010 | Take et al. |
| 2011/0117413 | A1 | 5/2011 | Wang et al. |
| 2011/0151333 | A1 | 6/2011 | Hatalay et al. |
| 2012/0102725 | A1 | 5/2012 | Fuller et al. |
| 2012/0229096 | A1 | 9/2012 | Nazri |
| 2012/0231321 | A1 | 9/2012 | Huang et al. |
| 2012/0315384 | A1 | 12/2012 | Abd Elhamid et al. |
| 2013/0004857 | A1 | 1/2013 | Kia et al. |
| 2013/0052509 | A1 | 2/2013 | Halalay et al. |
| 2013/0115519 | A1* | 5/2013 | Lee ............ C08G 73/1042 429/252 |
| 2013/0130093 | A1 | 5/2013 | Wang et al. |
| 2013/0183582 | A1 | 7/2013 | Halalay et al. |
| 2013/0284338 | A1 | 10/2013 | Xiao et al. |
| 2014/0242452 | A1 | 8/2014 | Pieczonka et al. |
| 2014/0272526 | A1 | 9/2014 | Huang |
| 2014/0272558 | A1 | 9/2014 | Xiao et al. |
| 2015/0014890 | A1 | 1/2015 | Xiao |
| 2015/0093626 | A1 | 4/2015 | Fuller et al. |
| 2015/0093639 | A1 | 4/2015 | Halalay et al. |
| 2016/0111721 | A1 | 4/2016 | Xiao et al. |
| 2017/0155175 | A1 | 6/2017 | Halalay et al. |

FOREIGN PATENT DOCUMENTS

| | | | |
|---|---|---|---|
| CN | 102668171 A | 9/2012 | |
| CN | 104518190 A | 4/2015 | |
| CN | 106816626 A | 6/2017 | |
| DE | 102014113894 A1 | 4/2015 | |
| DE | 102016122403 A1 | 6/2017 | |
| JP | 59031571 A * | 2/1984 | ............ H01M 10/05 |
| WO | WO-2017120884 A1 | 7/2017 | |

OTHER PUBLICATIONS

Komaba, et al., Inorganic Electrolyte Additives to Suppress the Degradation of Graphite Anodes by Dissolved Mn(II) for Lithium-Ion Batteries, Journal of Power Sources 119-121, 2003, pp. 378-382.

Shahrisa, et al., CHemistry of Pyrones, Part 3: New Podands of 4H-Pyran-4-ones; 5 Molecules, 2000, pp. 200-207.

Bruening, et al., Understanding Cation-Macrocycle Binding Selectivity in Single-Solvent Extractions, and Liquid Membrane Systems by Quantifying Thermodynamic Interations; Cation Binding by Macrocycles, Chapter 2, 1990, pp. 112-113, Marcel Dekker Inc., New York and Basel.

Kaifer, et al., Redox Control of Cation Binding in Macrocyclic Systems; Cation Binding by Macrocycles, 1990, Chapert 8, p. 364, Marcel Dekker Inc., New York and Basel.

Atwood, et al., Cation Complexation by Calizarenes; Cation Binding by Macrocycles, 1990, Chapter 15, pp. 581-582, 587; Marcel Dekker Inc., New York and Basel.

Toner, et al., Modern Aspects of Host-Guest Chemistry: Molecular Modeling and Conformationally Restricted Hosts; Crown Ethers and Analogs, 1989, Chapter 3, pp. 81-83, John Wiley and Sons, New York.

Vogtle, et al., Crown-ether-complexes and Selectivity; Crown Ethers and Analogs, 1989, Chapter 4, pp. 208-215, John Wiley and Sons, New York.

Weber, E., New Developments in Crown Ether Chemistry: Lariats, Spherands, and Second-Sphere Complexes; Crown Ethers and Analogs, 1989, Chapter 5, pp. 306-307, 309, 314-315, 320-321, John Wiley and Sons, New York.

Arora, et al., Battery Separators, Chem. Rev. 104, 2004, pp. 4419-4462.

"Teijin Develops More Heat-Resistant Li-Ion Battery Separator", Trading Markets.Com, Sep. 10, 2009, 3 pages, http://www.tradingmarkets.com.

Plastics Today Staff, "TonenGeneral and Toray team up to create lithium-ion battery separator films", plasticstoday.com, Nov. 4, 2009, 2 pages, http://www.plasticstoday.com.

Montanari, F., et al., "Hydroxymethyl Derivatives of 18-Crown-6 and [2.2.2] Cryptand: Versatile Intermediates for the Synthesis of Lipophilic and Polymer-Bonded Macrocyclic Ligands," J. Org. Chem, 1982, 47, 1298-1302.

Babb, D. A., "Synthesis and Metal Ion Complexation of Synthetic Ionophores," A Ph.D. Dissertation in Chemistry, Texas Tech University, Dec. 1985, 149 pages.

Manecke, G., et al., "Polymere Kryptanden, 1", Makromol. Chem. 182, 1973-1984, (1981).

Kopolow, S., et al., "Poly(vinyl macrocyclic polyethers). Synthesis and Cation Binding Properties", vol. 6, No. 1, Jan.-Feb. 1973, pp. 133-142.

(56) References Cited

OTHER PUBLICATIONS

Smid, J., et al., "Synthesis of 4'-Vinylbenzocrown Ethers", Organic Preparations and Procedures Int. 8(4), 1976, pp. 193-196.
Anjan Banerjee et al.; "Increasing the durability of Li-ion batteries by means of manganese ion trapping materials with nitrogen functionalities"; Journal of Power Sources 341 (2017); pp. 457-465.
Anjan Banerjee et al.; "Review—Multifunctional Materials for Enhanced Li-Ion Batteries Durability: A Brief Review of Practical Options"; Journal of the Electrochemical Society, 164 (1); 2017; pp. A6315-A6323.
Anjan Banerjee et al.; "Multifunctional Manganese Ions Trapping and Hydrofluoric Acid Scavenging Separator for Lithium Ion Batteries Based on Poly (ethylene-alternate-maleic acid) Dilithium Salt"; Advanced Energy Materials; 2016; 9 pages.
Ziv, et al. "Manganese Sequestration and Li-Ion Batteries Durability Enhancement by Polymeric 18-Crown-6 Ethers"; Journal of the Electrochemical Society, 161 (9); May 21, 2014; pp. A1213-A1217.
Halalay et al.; U.S. Appl. No. 15/644,436, filed Jul. 7, 2017 entitled "Iron Ion Trapping Van Der Waals Gripper Additives for Electrolyte Systems in Lithium-Ion Batteries"; 54 pages.
Luski et al.; U.S. Appl. No. 15/186,526, filed Jun. 19, 2016 entitled "Lithium Ion Battery"; 74 pages.
Wu et al.; U.S. Appl. No. 15/644,444, filed Jul. 7, 2017 entitled "Electrolyte System Suppressing or Minimizing Metal Contaminants and Dendrite Formation in Lithium Ion Batteries"; 45 pages.
Halalay et al.; U.S. Appl. No. 15/644,422, filed Jul. 7, 2017 entitled "Polymeric Ion Traps for Suppressing or Minimizing Transition Metal Ions and Dendrite Formation or Growth in Lithium-Ion Batteries"; 43 pages.
First Office Action for Chinese Application No. 201410642253.9 dated May 24, 2016; 7 pages.

\* cited by examiner

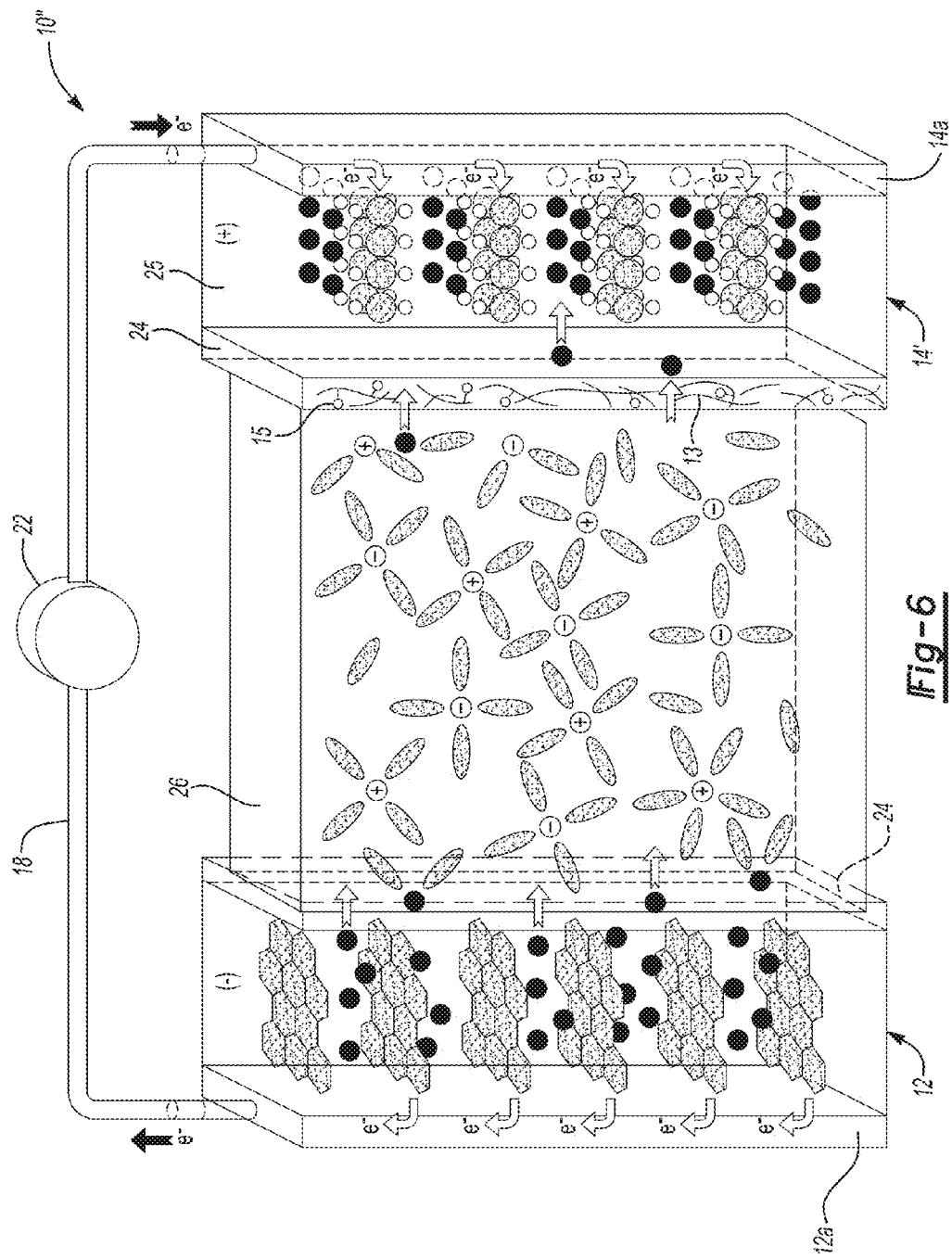

US 10,008,749 B2

LITHIUM ION BATTERY

TECHNICAL FIELD

The present disclosure relates generally to lithium ion batteries.

BACKGROUND

Secondary, or rechargeable, lithium ion batteries are used in many stationary and portable devices, such as those encountered in the consumer electronic, automobile, and aerospace industries. The lithium ion class of batteries has gained popularity for various reasons including a relatively high energy density, a general lack of any memory effect when compared to other kinds of rechargeable batteries, a relatively low internal resistance, and a low self-discharge rate when not in use. The ability of lithium batteries to undergo repeated charging-discharging cycling over their useful lifetimes makes them an attractive and dependable electrical energy source.

SUMMARY

A lithium ion battery includes a positive electrode including a binder material, a negative electrode including a binder material, and a nanoporous or microporous polymer separator soaked in an electrolyte solution, the nanoporous or microporous polymer separator being operatively disposed between the positive electrode and the negative electrode. One or more chelating agents are included in the battery, to complex with transition metal ions in a manner sufficient to not affect movement of lithium ions across the nanoporous or microporous polymer separator during operation of the lithium ion battery. The chelating agents are at least one of: dissolved in the electrolyte solution; grafted onto the polymer of the nanoporous or microporous polymer separator as a substitute pendant group; operatively disposed within pores of the separator; attached to the binder material of the negative electrode; attached to the binder material of the positive electrode; coated on a surface of the separator; coated on a surface of the negative electrode; and coated on a surface of the positive electrode. The chelating agents are selected from: ion traps in molecular form selected from the group consisting of polyamines, thiols, and alkali metal salts of organic acids; polymers functionalized with alkali metal salts of organic acids; polymers functionalized with nitrogen-containing chemical groups; and polymers functionalized with two or more functional groups.

BRIEF DESCRIPTION OF THE DRAWINGS

Features of examples of the present disclosure will become apparent by reference to the following detailed description and drawings, in which like reference characters correspond to similar, though perhaps not identical, components. For the sake of brevity, reference characters or features having a previously described function may or may not be described in connection with other drawings in which they appear.

FIG. 6 is a schematic, perspective view of yet another example of a lithium ion battery during a discharging state, where an electrode of the battery includes a structure coated with a porous film of an example of the polymeric chelating agent disclosed herein;

(FIGS. 7A and 7C) and 55° C. (FIGS. 7B and 7D), the histograms in the insets show the manganese amounts in ppm (normalized to the LMO mass, i.e., µg Mn per mg LMO) found on the negative electrodes after 100 cycles;

(FIG. 9A) and 55° C. (FIG. 9B), the histograms in the insets show the manganese amounts in ppm (normalized to the LMO mass i.e., µg Mn per mg LMO) found on the negative electrodes after 30 days;

(FIG. 10A) and 55° C. (FIG. 10B), the histograms in the insets show the manganese amounts in ppm (normalized to the LMO mass) found on the negative electrodes after 30 days;

Figure 4:
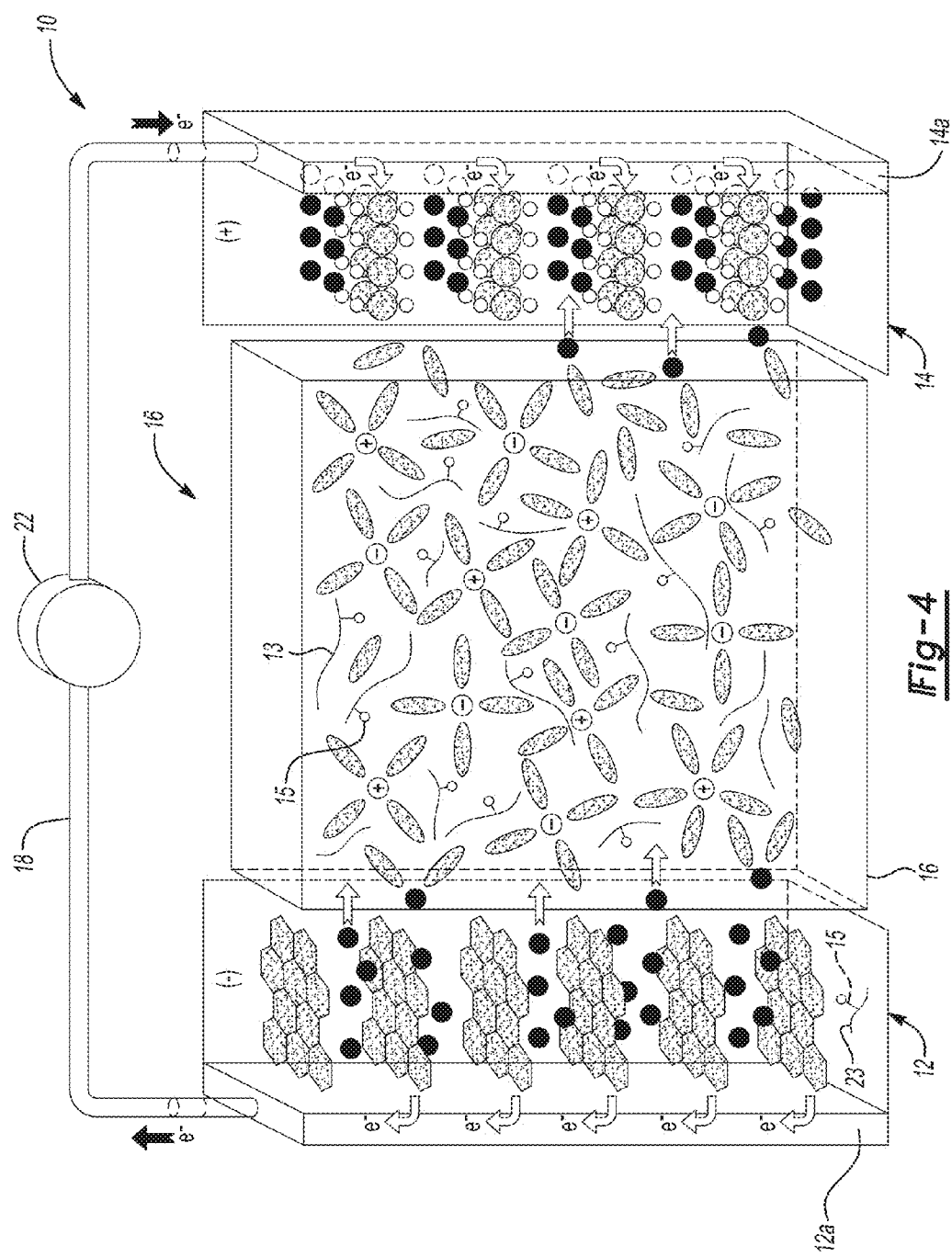
FIG. 4 is a schematic, perspective view of an example of a lithium ion battery during a discharging state, where the porous separator of the battery includes an example of the chelating agent disclosed herein.
Figure 5:
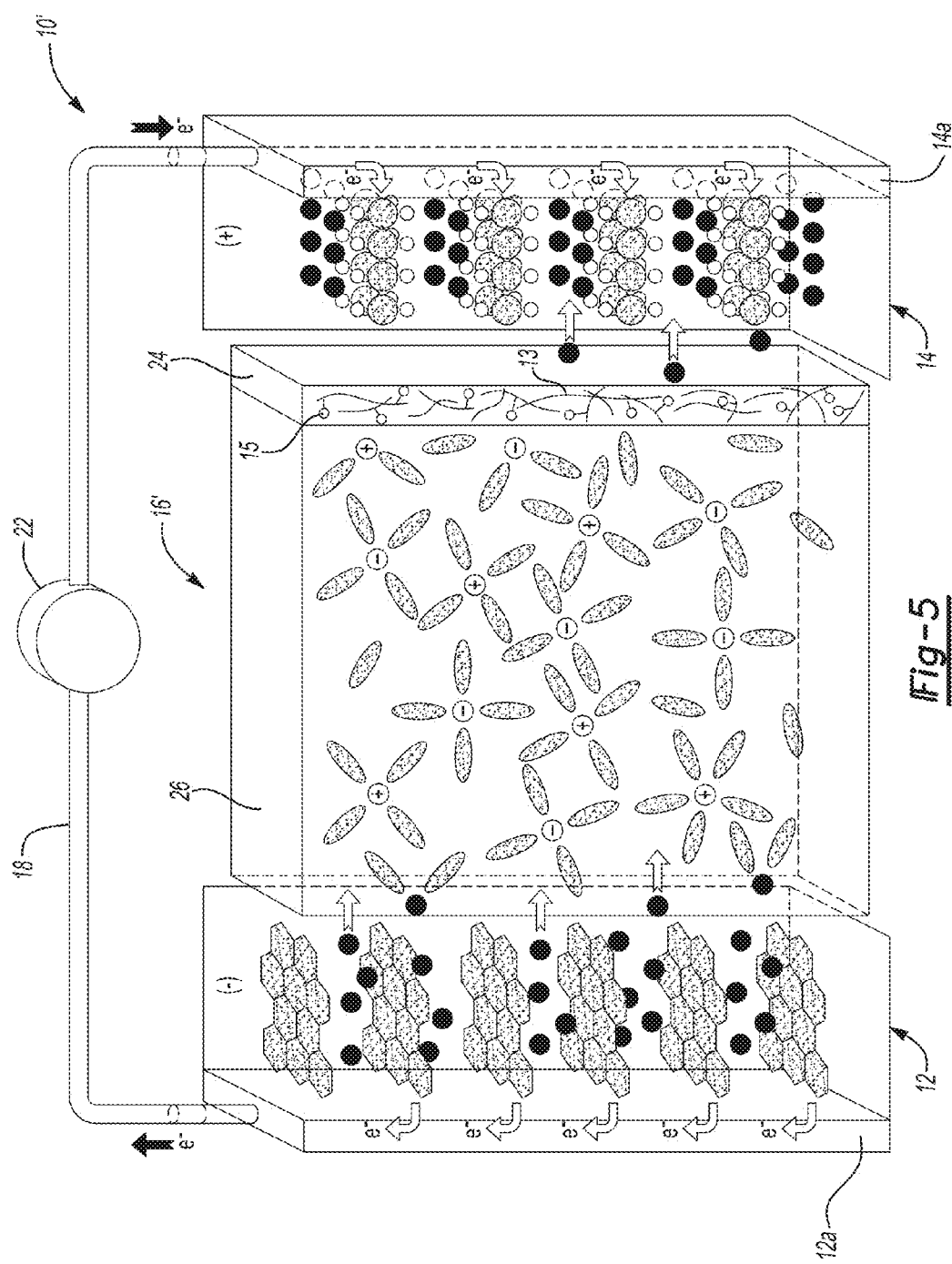
FIG. 5 is a schematic, perspective view of another example of a lithium ion battery during a discharging state, where the separator of the battery includes a porous membrane coated with a porous film of an example of the polymeric chelating agent disclosed herein.

The separators shown in FIGS. 4 through 6 are depicted to illustrate the flow of ions between the negative and positive electrodes of the respective lithium ion batteries, and thus are not necessarily drawn to scale.

DETAILED DESCRIPTION

A lithium ion battery generally operates by reversibly passing lithium ions between a negative electrode (sometimes called an anode) and a positive electrode (sometimes called a cathode). The negative and positive electrodes are situated on opposite sides of a porous polymer separator that is soaked with an electrolyte solution suitable for conducting lithium ions. Each of the negative and positive electrodes is also operatively associated with, or supported by its respective current collector. The current collectors associated with the two electrodes are connected, e.g., via tabs, to an interruptible external circuit that allows an electric current to pass between the electrodes to electrically balance the related migration of lithium ions. Further, the negative electrode may include a lithium intercalation host material, and the positive electrode may include a lithium-based active material that can store lithium ions at a higher electric potential than the intercalation host material of the negative electrode. The electrolyte solution may contain a lithium salt dissolved in an aprotic non-aqueous solvent.

It has been found that lithium ion batteries are deleteriously affected by the dissolution of transition metal cations from the positive electrode, which results in accelerated capacity fading, and thus loss of durability in the battery. The transition metal cations migrate from the positive electrode to the negative electrode of the battery, leading to its "poisoning". In one example, a graphite electrode is poisoned by $Mn^{+2}$, $Mn^{+3}$ or $Mn^{+4}$ cations that dissolve from the spinel $Li_xMn_2O_4$ active material of the positive electrode. For instance, the $Mn^{+2}$ cations may migrate through the battery electrolyte, and deposit onto the graphite electrode. When deposited onto the graphite, the $Mn^{+2}$ cations may become Mn metal. It has been shown that a relatively small amount (e.g., 90 ppm) of Mn metal can poison the graphite electrode and prevent reversible electrode operation, thereby deleteriously affecting the useful life of the battery. The deleterious effect of the Mn deposited at the negative electrode is significantly enhanced during battery exposure to above-ambient temperatures (e.g., above 40° C.), irrespective of whether the exposure occurs through mere storage (i.e., simple stand at open circuit voltage in some state of charge) or during battery operation (i.e., during charging, during discharging, or during charging-discharging cycling).

The poisoning of the lithium ion battery by transition metals dissolving from the positive electrode may be reduced or prevented by incorporating an example(s) of the chelating agents disclosed herein into the battery. The chelating agent(s), alone or tethered to a polymeric or ceramic material, complex with and trap transition metal cations, such as Mn cations that leach from the positive electrode of the lithium ion battery, and thereby prevents their migration to the negative electrode and the associated battery performance degradation. Any transition metal cation may be trapped by examples of the chelating agent(s), including, for example, cations of manganese (e.g., $Mn^{+2}$, $Mn^{+3}$, $Mn^{+4}$), iron (e.g., $Fe^{2+}$, $Fe^{3+}$), chromium (e.g., $Cr^{2+}$, $Cr^{3+}$), cobalt (e.g., $Co^{2+}$, $Co^{3+}$), nickel (e.g., $Ni^{2+}$, $Ni^{3+}$, $Ni^{4+}$), and/or vanadium (e.g., $V^{3+}$, $V^{4+}$, $V^{5+}$).

Some previously identified transition metal cation chelating/trapping materials may be quite expensive in some instances. Examples of the present disclosure set forth new materials that are less expensive, while yet performing well to prevent transition metal cations from migrating to the negative electrode.

Examples of the chelating agent disclosed herein may be any or a combination of: dissolved or dispersed in the electrolyte solution; grafted onto/tethered to a material of the nanoporous or microporous separator (e.g., as a substitute pendant group grafted onto a polymeric or ceramic material in/of the separator); attached to the binder material of the negative electrode; attached to the binder material of the positive electrode; disposed within open pores of the separator; coated on a surface of the separator; coated on a surface of the negative electrode; and/or coated on a surface of the positive electrode.

Suitable chelating agents include metal ionophores, which, as used herein, are chemical compounds that bind to particular ions (e.g., $Mn^{+2}$ or other transition metal cations) while allowing the passage of lithium ions. Inside the battery, the chelating agent effectively traps the unwanted metal cations, while the movement of lithium ions across the nanoporous or microporous separator is not affected during operation of the battery. In an example, the chelating agent selectively complexes with the unwanted metal cations, for example, by immobilizing the metal cations (e.g., $Co^{+2}$, $Fe^{+2}$, $Mn^{+2}$, etc.) that may dissolve into the electrolyte solution from the positive electrode. The chelating agent thus operates as a metal cation scavenger that traps and immobilizes the unwanted metal cations, to prevent the migration of the metal cations through the electrolyte solution and to the negative electrode. It is to be understood that the chelating agents complex less strongly with lithium ions (e.g., a single trapping site out of each one hundred sites are occupied by a $Li^+$ cation compared to a manganese cation), and thus does not adversely affect the movement of lithium ions between the negative and positive electrodes.

Figure 1:
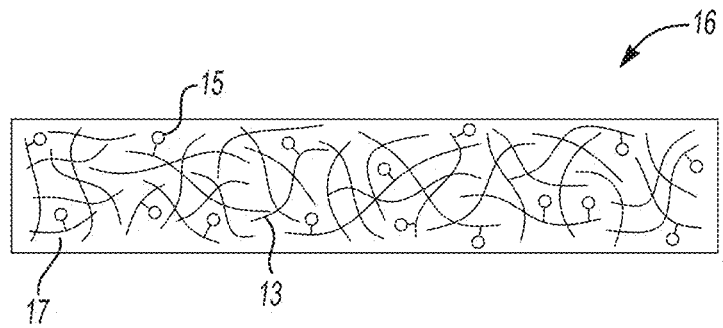
FIG. 1 is a schematic, cross-sectional view of an example of a porous separator formed with an example of a polymeric chelating agent disclosed herein.
Figure 2:
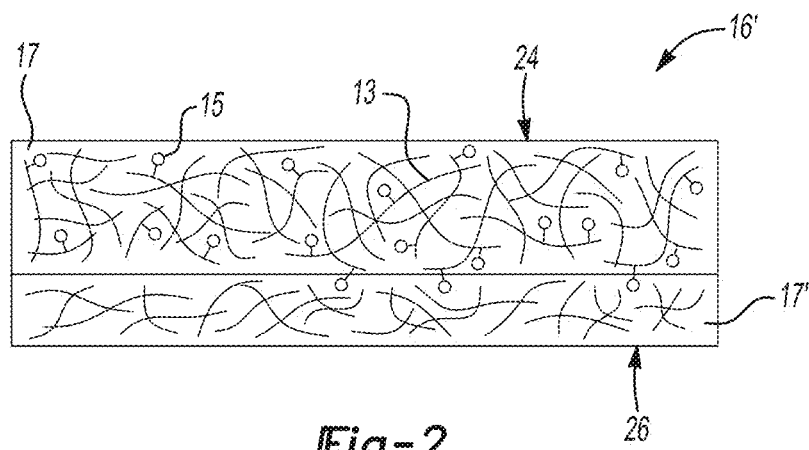
FIG. 2 is a schematic, cross-sectional view of an example of a porous separator including a porous membrane coated with a porous film of an example of a polymeric chelating agent disclosed herein.
Figure 3:
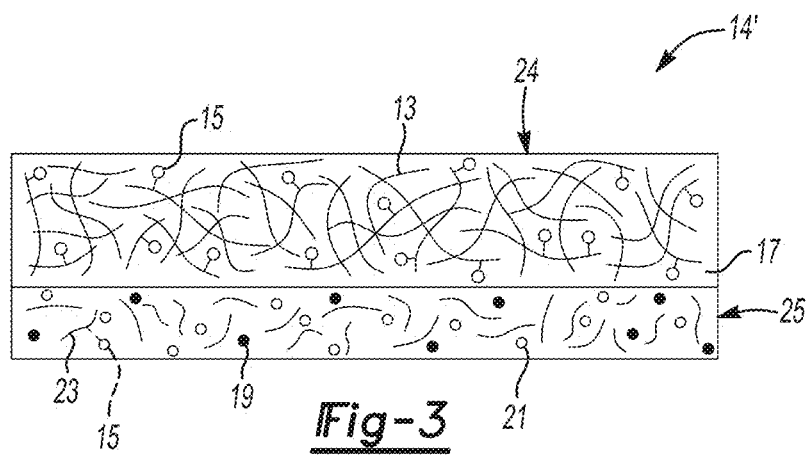
FIG. 3 is a schematic, cross-sectional view of an example of a positive electrode including a structure coated with a porous film of an example of a polymeric chelating agent disclosed herein.

FIGS. 1 through 3 illustrate different examples of a polymeric chelating agent disclosed herein.

In FIG. 1, a polymeric chelating agent forms the lithium ion battery separator 16. In this example, the separator 16 itself is a porous film of a polymeric chelating agent. In FIG. 1, the polymer backbone is represented by reference numeral 13, the chelating agent bonded thereto is represented by reference numeral 15, and the pores in the film are represented by reference numeral 17.

As illustrated in FIG. 1, this example of the separator 16 has pores 17 formed throughout the polymer backbone 13. The chelating agent 15 is attached to the polymer backbone 13. In this example, the bonded chelating agent 15 is part of the separator matrix and may be present inside of the open pores 17. In examples of the present disclosure, free (molecular) chelating agent 15 (i.e., not bound to a polymer) or polymeric chelating agents may also be used, e.g., as filler material within the separator matrix and/or operatively disposed within pores 17 of separator 16 (e.g., as beads (separate from the separator matrix) inside the pores 17 of the separator 16).

In another example, free (molecular) chelating agent 15 may also be dissolved or dispersed in the electrolyte solution.

Referring now to FIG. 2, the polymeric chelating agent is in the form of a coating 24 on a nanoporous or microporous membrane 26. Together, the coating 24 and the nanoporous or microporous membrane 26 form another example of the lithium ion battery separator 16'. Since the coating 24 is formed on the surface of a nanoporous or microporous membrane 26, some of the polymeric chelating agent may, in some instances, migrate into the pores 17' of the nanoporous or microporous membrane 26.

The polymeric chelating agent may be formed as described in reference to FIG. 1, and includes the chelating agent 15 attached to the polymer backbone 13. The resulting coating 24 also includes the pores 17. In an example of coating the membrane 26 with the polymeric chelating agent, the polymeric chelating agent may be suspended in tetrahydrofuran, and this suspension may be deposited on or otherwise exposed to the membrane 26. For example, a wet film of the suspension may be applied to the membrane 26.

Examples of suitable nanoporous or microporous membranes 26 include a polyolefin. As examples, the polyolefin may be polyethylene (PE), polypropylene (PP), a blend of PE and PP, or multi-layered structured porous films of PE and/or PP. Commercially available polyolefin porous membranes 26 include CELGARD® 2500 (a monolayer polypropylene separator) and CELGARD® 2320 (a trilayer polypropylene/polyethylene/polypropylene separator) available from Celgard LLC.

In another example, the nanoporous or microporous membrane 26 may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polymethylpentene, polyolefin copolymers, acrylonitrile-butadiene styrene copolymers (ABS), polystyrene copolymers, polymethylmethacrylate (PMMA), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polyvinylidene fluoride copolymers (e.g., PVdF-hexafluoropropylene (PVdF-HFP)), and polyvinylidene fluoride terpolymers, polyvinylfluoride, liquid crystalline polymers (e.g., VECTRAN™ (Hoechst AG, Germany) and ZENITE® (DuPont, Wilmington, Del.)), polyaramides, polyphenylene oxide, cellulosic materials, mesoporous silica, and/or combinations thereof. It is believed that another example of a liquid crystalline polymer that may be used for the membrane 26 is poly(p-hydroxybenzoic acid). In yet another example, the membrane 26 may be a combination of one of these polymers and a polyolefin (such as PE and/or PP). Some other commercially available separators are available from Entek International, Asahi-Kasei Corporation, Toray Industries, and SK Energy.

The nanoporous or microporous membrane 26 may contain a single layer or a multi-layer laminate fabricated from either a dry or wet process, by solvent casting, by a non-woven fiber laying process, or by any other process for making a nanoporous or microporous membrane 26 with properties suitable for application in Li-ion batteries. For example, in one example, a single layer of the polyolefin may constitute the entirety of the membrane 26. In another example, a single layer of one or a combination of any of the polymers from which the membrane 26 may be formed (e.g., the polyolefin and/or one or more of the other polymers listed above for the membrane 26) may constitute the entirety of the membrane 26. As another example, however, multiple discrete layers of similar or dissimilar polyolefins and/or polymers for the membrane 26 may be assembled into the membrane 26. In one example, a discrete layer of one or more of the polymers may be coated on a discrete layer of the polyolefin for the membrane 26. Further, the polyolefin (and/or other polymer) layer, and any other optional polymer layers, may further be included in the membrane 26 as a fibrous layer to help provide the membrane 26 with appropriate structural and porosity characteristics. A more complete discussion of single and multi-layer lithium ion battery separators, and the dry and wet processes that may be used to make them, can be found in P. Arora and Z. Zhang, "Battery Separators," *Chem. Rev.*, 104, 4424-4427 (2004).

Still other suitable nanoporous or microporous membranes 26 include those that have a ceramic layer attached thereto, those that have ceramic filler in the polymer matrix (i.e., an organic-inorganic composite matrix), and those that are formed from a ceramic material. Some examples of suitable ceramic materials include alumina ($Al_2O_3$) and silica ($SiO_2$.)

Referring now to FIG. 3, the polymeric chelating agent is in the form of a coating 24 on a structure 25. Together, the coating 24 and the structure 25 form an example of a positive electrode 14'. Coating 24 may also or alternatively be on the negative electrode 12, e.g., as shown in phantom in FIG. 6. While not shown in FIG. 6, it is to be understood that the entire negative electrode 12 may be encapsulated in the coating 24.

As mentioned above, the polymeric chelating agent includes the chelating agent 15 attached to the polymer backbone 13. The resulting coating 24 also includes the pores 17. In an example of coating the structure 25 with the polymeric chelating agent, the polymeric chelating agent may be suspended in tetrahydrofuran, and this suspension may be deposited on or otherwise exposed to at least the surface of the structure 25 to be positioned adjacent to a nanoporous or microporous membrane 26 (not shown in FIG. 3) in a lithium ion battery. While not shown in FIG. 3, it is to be understood that the entire structure 25 may be encapsulated in the coating 24.

The structure 25 includes a lithium transition metal based active material 19, a conductive carbon 21, and a binder 23. It is to be understood that any lithium transition metal based active material 19 that can sufficiently undergo lithium intercalation and deintercalation while functioning as the positive terminal of a lithium ion battery may be used. Examples of the active material 19 include at least one of spinel lithium manganese oxide ($LiMn_2O_4$, a.k.a. LMO), lithium cobalt oxide ($LiCoO_2$, a.k.a. LCO), a manganese-nickel-oxide spinel [$Li(Mn_{1.5}Ni_{0.5})O_2$] (a.k.a. LNMO), a layered lithium nickel-manganese-cobalt oxide [$Li(Ni_{1-x}Mn_{1-y}Co_{x+y})O_2$] (a.k.a. NMC), $LiNiO_2$, $Li_2MSiO_4$ (M=Co, Fe, Mn), a lithium iron polyanion oxide, such as lithium iron phosphate ($LiFePO_4$) or lithium iron fluorophosphate ($Li_2FePO_4F$), or a lithium rich layer-structure cathode, such as $xLi_2MnO_3$-$(1-x)LiMO_2$ (M is composed of any ratio of Ni, Mn and Co). Other lithium-based active materials may also be utilized, such as $LiNi_{1-x}Co_{1-y}M_{x+y}O_2$, $LiMn_{1.5-x}Ni_{0.5-y}M_{x+y}O_4$ (M is composed of any ratio of Al, Cr, Ti, and/or Mg), stabilized lithium manganese oxide spinel ($Li_xMn_{2-y}M_yO_4$, with M is composed of any ratio of Al, Cr, Ti, and/or Mg), lithium vanadium oxide ($LiV_2O_5$), $Li_2MSiO_4$ (M is composed of any ratio of Co, Fe, and/or Mn), $xLi_2MnO_3$-$(1-x)LiMO_2$ (M is composed of any ratio of Ni, Mn and/or Co), and any other nickel-manganese-cobalt material. By "any ratio" it is meant that any element may be present in any amount. So, in some examples, M could be Ni, with or without Co and/or Mn, or any other combination of the listed elements. In another example, anion substitutions may be made in the lattice of any example of the lithium transition metal based active material to stabilize the crystal structure. For example, any O atom may be substituted with an F atom.

The conductive carbon 21 of the structure 25 may be any high surface area carbon, such as acetylene black, that intermingles with the lithium transition metal based active material 19. "High surface area carbon" as used herein is meant to include any carbon having a BET (=Brunauer-Emmett-Teller) surface area ranging from 50 to 2,000 m$^2$/g. The conductive carbon 21 may be added to ensure electron conduction between a current collector of the lithium ion battery and the active material particles 19 of the positive electrode 14'. The conductive carbon 21 may also be carbon nanotubes, both single-walled (SW) and multi-walled (MW), present in amounts ranging from about 0.02 wt % to about 1 wt %.

In an example, as shown in phantom in FIG. 3, the chelating agent 15 may be attached to the binder 23 of the positive electrode 14'. It is to be understood that the chelating agent 15 may also or alternatively be attached to the binder 23 of the negative electrode 12 (as shown in phantom in FIG. 4).

The binder 23 of the structure 25 (or of the negative electrode 12) may be any polymeric binder that is capable of structurally holding the lithium-based active material 19 together. Some examples of the binder 23 include polyvinylidene fluoride (PVdF), ethylene propylene diene monomer (EPDM) rubber, carboxymethyl cellulose (CMC), lithium polyacrylate (LiPAA), sodium polyacrylate (NaPAA), sodium alginate, and/or lithium alginate. In an example, LiPAA and Na/Li alginate may be desirable for use in high-voltage (5 V) positive electrode materials.

FIGS. 4 through 6 illustrate different examples of the lithium ion battery 10, 10', 10" incorporating different examples of the polymeric chelating agent disclosed herein. The batteries 10, 10', 10" generally include a negative electrode 12, a negative-side current collector 12a, a positive electrode 14, a positive-side current collector 14a, and a separator 16, 16', or 26 positioned between the negative electrode 12 and the positive electrode 14. It is to be understood that the separator 16, 16', 26 and/or the positive electrode 14 and/or the negative electrode 12 may include the chelating agent 15 and polymer backbone 13 coated thereon. Each example of the lithium ion battery 10, 10', 10" also includes an interruptible external circuit 18 that connects the negative electrode 12 and the positive electrode 14.

Referring now to FIG. 4, the lithium ion battery 10 includes the separator 16 shown in FIG. 1 disposed between a negative electrode 12 and a positive electrode 14. As discussed above, the separator 16 is formed of an example of the polymeric chelating agent. The separator 16, which operates as an electrolyte solution-containing sponge and an electrical insulator, is sandwiched between the negative electrode 12 and the positive electrode 14 to prevent physical contact between the two electrodes 12, 14 and the occurrence of a short circuit. The separator 16, in addition to providing a physical barrier between the two electrodes 12, 14, ensures passage of lithium ions (identified by the black dots and by the open circles having a (+) charge in FIG. 4) and related anions (identified by the open circles having a (−) charge in FIG. 4) through an electrolyte solution filling its pores. The chelating agent 15 present in the matrix of the separator 16 also effectively traps and immobilizes the unwanted metal cations (e.g., $Mn^{2+}$) to prevent the migration of these metal cations through the electrolyte solution and to the negative electrode 12. In another example, the chelating agent 15 (not tethered to a polymer) may be dissolved or dispersed in the electrolyte solution. Some examples of chelating agents in molecular form (one example of which is tetrasodium salt of ethylenediamine tetraacetic acid (EDTANa$_4$)) are listed further below.

The negative electrode 12 may include any lithium host active material that can sufficiently undergo lithium intercalation and deintercalation while functioning as the negative terminal of the lithium ion battery 10. Examples of the lithium host active material include graphite or a low surface area amorphous carbon. Graphite is widely utilized to form the negative electrode 12 because it exhibits favorable lithium intercalation and deintercalation characteristics, is relatively non-reactive, and can store lithium in quantities that produce a relatively high energy density. Commercial forms of graphite that may be used to fabricate the negative electrode 12 are available from, for example, Timcal Graphite & Carbon (Bodio, Switzerland), Lonza Group (Basel, Switzerland), or Superior Graphite (Chicago, Ill.). Other materials can also be used to form the negative electrode including, for example, lithium titanate (LTO), silicon or silicon-carbon composites, and tin oxide.

The negative electrode 12 may also include a polymer binder material 23 intermingled with the lithium host active material to structurally hold the lithium host active material together. Some examples of the binder include polyvinylidene fluoride (PVdF), ethylene propylene diene monomer (EPDM) rubber, carboxymethyl cellulose (CMC), sodium alginate, or lithium alginate. These materials (i.e., the lithium host active material and the binder) may be mixed with a high surface area carbon, such as acetylene black, to ensure electron conduction between the current collector (shown as 12a in FIG. 4) and the active material particles of the negative electrode 12. The negative-side current collector 12a may be formed from copper or any other appropriate electrically conductive material known to skilled artisans.

The positive electrode 14 in this example of the lithium ion battery 10 is similar to structure 25 previously described in reference to FIG. 3. In short, the positive electrode 14 may include any of the lithium transition metal based active materials 19, conductive carbons 21, and binders 23 previously described.

Adjacent to the positive electrode 14 is the positive-side current collector 14a, which may be formed from aluminum or any other appropriate electrically conductive material known to skilled artisans.

The negative-side current collector 12a and the positive-side current collector 14a may be positioned in contact with the negative electrode 12 and the positive electrode 14, respectively, to collect and move free electrons to and from an interruptible external circuit 18, which connects the negative electrode 12 and the positive electrode 14.

In an example, each of the negative electrode 12, the positive electrode 14, and the porous separator 16 are soaked in an electrolyte solution. It is to be understood that any appropriate electrolyte solution that can conduct lithium ions between the negative electrode 12 and the positive electrode 14 may be used in the lithium ion battery 10. In one example, the electrolyte solution may be a non-aqueous liquid electrolyte solution that includes a lithium salt dissolved in an organic solvent or a mixture of organic solvents. Skilled artisans are aware of the many non-aqueous liquid electrolyte solutions that may be employed in the lithium ion battery 10 as well as how to manufacture or commercially acquire them. Examples of lithium salts that may be dissolved in an organic solvent to form the non-aqueous liquid electrolyte solution include $LiClO_4$, $LiAlCl_4$, LiI, LiBr, LiSCN, $LiBF_4$, $LiB(C_6H_5)_4$, $LiCF_3SO_3$, $LiN(CF_3SO_2)_2$ (LiTFSI), $LiN(FSO_2)_2$(LiFSI), $LiAsF_6$, $LiPF_6$, $LiB(C_2O_4)_2$ (LiBOB), $LiBF_2(C_2O_4)$(LiODFB), $LiPF_4(C_2O_4)$(LiFOP), LiNO$_3$, and mixtures thereof. These and other similar lithium salts may be dissolved in a variety of organic solvents such as cyclic carbonates (ethylene carbonate, propylene carbonate, butylene carbonate, fluoroethylene carbonate), linear carbonates (dimethyl carbonate, diethyl carbonate, ethylmethyl carbonate), aliphatic carboxylic esters (methyl formate, methyl acetate, methyl propionate), γ-lactones (γ-butyrolactone, γ-valerolactone), chain structure ethers (1,2-dimethoxyethane, 1,2-diethoxyethane, ethoxymethoxyethane), cyclic ethers (tetrahydrofuran, 2-methyltetrahydrofuran), and mixtures thereof.

The electrolyte solution may also include a number of additives, such as solvents and/or salts that are minor components of the solution. Example additives include lithium bis(oxalato borate) (LiBOB), lithium difluoro oxalate borate (LiDFOB), vinylene carbonate, monofluoroethylene carbonate, propane sultone, 2-propyn-ol-methanesulfonate, methyl di-fluoro-acetate, succinic anhydride, maleic anhydride, adiponitrile, biphenyl, ortho-terphenyl, dibenzyl, diphenyl ether, n-methylpyrrole, furan, tiophene, 3,4-ethylenedioxythiophene, 2,5-dihydrofuran, trishexafluoro-iso-propylphosphate, trihydroxybenzene, tetramethoxytitanium, etc. While some examples have been given herein, it is to be understood that other additives could be used. When included, additives may make up from about 0.05% to about 5% of the composition of the electrolyte solution.

Other electrolytes may be used instead of the electrolyte solution. As examples, polymer electrolytes, ionic liquids, melt electrolytes, or the like may be used. Some specific examples of ionic liquids include 1-ethyl-3-methylimidazolium bis(fluorosulfonyl)imide, 1-ethyl-3-methylimidazolium bis(trifluoromethane sulfonyl)imide, phosphonium bis(trifluoromethane sulfonyl) imide, phosphonium bis(fluorosulfonyl) imide, triethyl(methoxymethyl) phosphonium bis(trifluoromethylsulfonyl)imide, triethyl(2-methoxyethyl)phosphonium, and bis(trifluoromethylsulfonyl)imide. Some examples of melt electrolytes include lithium bis(fluorosulfonyl)imide in dimethylmethanesulfonamide and lithium bis(trifluoromethane sulfonyl)imide in dimethylmethanesulfonamide. While some examples have been given herein, it is to be understood that other polymer electrolytes, ionic liquids, and eutectic melt electrolytes could be used.

The lithium ion battery 10 may support a load device 22 that can be operatively connected to the external circuit 18. The load device 22 receives a feed of electrical energy from the electric current passing through the external circuit 18 when the lithium ion battery 10 is discharging. While the load device 22 may be any number of known electrically-powered devices, a few specific examples of a power-consuming load device include an electric motor for a hybrid vehicle or an all-electrical vehicle, a laptop computer, a cellular phone, and a cordless power tool. The load device 22 may also, however, be an electrical power-generating apparatus that charges the lithium ion battery 10 for purposes of storing energy. For instance, the tendency of windmills and solar panels to variably and/or intermittently generate electricity often results in a need to store surplus energy for later use.

The lithium ion battery 10 may also include a wide range of other components that, while not depicted here, are nonetheless known to skilled artisans. For instance, the lithium ion battery 10 may include a casing, gaskets, terminals, tabs, and any other desirable components or materials that may be situated between or around the negative electrode 12 and the positive electrode 14 for performance-related or other practical purposes. Moreover, the size and shape of the lithium ion battery 10, as well as the design and chemical make-up of its main components, may vary depending on the particular application for which it is designed. Battery-powered automobiles and hand-held consumer electronic devices, for example, are two instances where the lithium ion battery 10 would most likely be designed to different size, capacity, and power-output specifications. The lithium ion battery 10, or a plurality of lithium ion batteries, may also be connected in series and/or in parallel with other similar lithium ion batteries to produce a greater voltage output and current (if arranged in parallel) or voltage (if arranged in series) if the load device 22 so requires.

The lithium ion battery 10 generally operates by reversibly passing lithium ions between the negative electrode 12 and the positive electrode 14. In the fully charged state, the voltage of the battery 10 is at a maximum (typically in the range 2.0V to 5.0V); while in the fully discharged state, the voltage of the battery 10 is at a minimum (typically in the range 0V to 2.0V). Essentially, the Fermi energy levels of the active materials in the positive and negative electrodes 14, 12 change during battery operation, and so does the difference between the two, known as the battery voltage. The battery voltage decreases during discharge, with the Fermi levels getting closer to each other. During charge, the reverse process is occurring, with the battery voltage increasing as the Fermi levels are being driven apart. During battery discharge, the external load device 22 enables an electronic current flow in the external circuit 18 with a direction such that the difference between the Fermi levels (and, correspondingly, the cell voltage) decreases. The reverse happens during battery charging: the battery charger forces an electronic current flow in the external circuit 18 with a direction such that the difference between the Fermi levels (and, correspondingly, the cell voltage) increases.

At the beginning of a discharge, the negative electrode 12 of the lithium ion battery 10 contains a high concentration of intercalated lithium while the positive electrode 14 is relatively depleted. When the negative electrode 12 contains a sufficiently higher relative quantity of intercalated lithium, the lithium ion battery 10 can generate a beneficial electric current by way of reversible electrochemical reactions that occur when the external circuit 18 is closed to connect the negative electrode 12 and the positive electrode 14. The establishment of the closed external circuit under such circumstances causes the extraction of intercalated lithium from the negative electrode 12. The extracted lithium atoms are split into lithium ions (identified by the black dots and by the open circles having a (+) charge) and electrons (e⁻) as they leave an intercalation host at the negative electrode-electrolyte interface.

The chemical potential difference between the positive electrode 14 and the negative electrode 12 (ranging from about 2.0V to about 5.0V, depending on the exact chemical make-up of the electrodes 14, 12) drives the electrons (e⁻) produced by the oxidation of intercalated lithium at the negative electrode 12 through the external circuit 18 towards the positive electrode 14. The lithium ions, which are also produced at the negative electrode 12, are concurrently carried by the electrolyte solution through the porous separator 16 towards the positive electrode 14. The electrons (e⁻) flowing through the external circuit 18 and the lithium ions migrating across the separator 16 in the electrolyte solution eventually reconcile and form intercalated lithium at the positive electrode 14. The electric current passing through the external circuit 18 can be harnessed and directed through the load device 22 until the level of intercalated lithium in the negative electrode 12 falls below a workable level or the need for electrical energy ceases.

The lithium ion battery 10 can be charged or re-powered at any time after a partial or full discharge of its available capacity by applying an external battery charger to the lithium ion battery 10 to reverse the electrochemical reactions that occur during battery discharge. The connection of an external power source to the lithium ion battery 10 compels the otherwise non-spontaneous oxidation of lithium transition metal oxide or phosphate at the positive electrode 14 to produce electrons and release lithium ions. The electrons, which flow back towards the negative electrode 12 through the external circuit 18, and the lithium ions, which are carried by the electrolyte across the microporous polymer separator 16 back towards the negative electrode 12, reunite at the negative electrode 12 and replenish it with intercalated lithium for consumption during the next battery discharge cycle.

The external battery charger that may be used to charge the lithium ion battery 10 may vary depending on the size, construction, and particular end-use of the lithium ion battery 10. Some suitable external battery chargers include a battery charger plugged into an AC wall outlet and a motor vehicle alternator.

Referring now to FIG. 5, another example of the lithium ion battery 10' is depicted. This example includes the separator 16' shown in FIG. 2 disposed between a negative electrode 12 and a positive electrode 14. As discussed above, the coating 24 on the membrane 26 of the separator 16' is formed of an example of the polymeric chelating agent.

In this example, the separator 16' operates as both an electrical insulator and a mechanical support, and is sandwiched between the negative electrode 12 and the positive electrode 14 to prevent physical contact between the two electrodes 12, 14 and the occurrence of a short circuit. The separator 16 ensures passage of lithium ions (identified by the black dots and by the open circles having a (+) charge in FIG. 5) and related anions (identified by the open circles having a (−) charge in FIG. 5) through an electrolyte solution filling its pores. The chelating agent 15 present in the coating 24 of the separator 16' also effectively traps and immobilizes the unwanted metal cations (e.g., $Mn^{2+}$) to prevent the migration of these metal cations through the electrolyte solution and to the negative electrode 12.

The other components (e.g., the electrodes 12, 14, current collectors 12a, 14a, external circuit 18, load 22, etc.) and the operation of the battery 10' are similar to the components previously described herein in reference to the battery 10 and the operation of the battery 10.

Referring now to FIG. 6, still another example of the lithium ion battery 10" is depicted. This example includes the positive electrode 14' shown in FIG. 3 disposed so that the coating 24 is adjacent to one side of the porous membrane 26 (which, in this example, functions as a separator). As discussed above, the coating 24 on the structure 25 of the positive electrode 14' is formed of an example of the polymeric chelating agent. Also as mentioned above, coating 24 may also or alternatively be on the negative electrode 12, e.g., as shown in phantom in FIG. 6.

In this example, the membrane 26 operates as both an electrical insulator and a mechanical support, and is sandwiched between the negative electrode 12 and the positive electrode 14' to prevent physical contact between the two electrodes 12, 14' and the occurrence of a short circuit. The membrane 26 ensures passage of lithium ions (identified by the black dots and by the open circles having a (+) charge in FIG. 6) and related anions (identified by the open circles having a (−) charge in FIG. 6) through an electrolyte solution filling its pores. Any examples of the membrane 26 previously described may be used in this example of the battery 10".

As mentioned above, the coating 24 of the positive electrode 14' is positioned adjacent to the membrane 26. In this example, the chelating agent 15 present in the coating 24 of the positive electrode 14' effectively traps and immobilizes the unwanted metal cations (e.g., $Mn^{2+}$) to prevent/reduce the migration of these metal cations through the membrane 26 (and the electrolyte solution) and to the negative electrode 12.

The other components (e.g., the electrode 12, current collectors 12a, 14a, external circuit 18, load 22, etc.) and the operation of the battery 10" are similar to the components previously described herein in reference to the battery 10 and the operation of the battery 10.

Examples of the present disclosure present new materials to effectively trap and immobilize the unwanted metal cations to prevent/reduce the migration of these metal cations to the negative electrode 12. Examples of chelating agents according to the present disclosure are selected from:

1) ion traps in molecular form selected from the group consisting of: polyamines, thiols, alkali metal salts of organic acids (examples of organic acids include, e.g., phenols, alcohols, thiols, carboxylic acids, and sulfonic acids), and combinations thereof;

2) polymers functionalized with alkali metal salts of organic acids;

3) polymers functionalized with nitrogen-containing functional groups; and 4) polymers with multiple functional groups (some examples of which include bactins, chitosan, lignin, etc.) Some examples of functional groups include carboxylic acid salts, amines, hydroxyl groups, etc. Categories 2)-4) are examples of polymeric chelating agents described herein.

Some non-limiting examples of each of the categories are described below. It is to be understood that any of lithium, sodium, potassium and/or cesium salts of any examples of categories (1-4) may be used in examples of the chelating agent(s) of the present disclosure. Further, many, but not all of the chemical structures are shown for the examples below.

1. Ion Traps in Molecular Form 1.1 Alkali metal (e.g., any or a mixture of Li, Na, K, and Cs) salts of organic acids 1.1.1. Bidentate ("-dentate" as used herein is meant to signify the number of acidic groups available to complex with unwanted transition metal ions; e.g., "bidentate" includes two such acidic groups, "tridentate" includes three, etc. Multi-dentate is meant to include bidentate, tridentate . . . etc.)

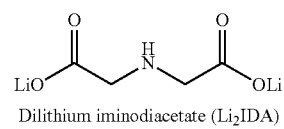

Dilithium iminodiacetate (Li$_2$IDA)

Disodium iminodiacetate (Na$_2$IDA)

1.1.2. Tridentate

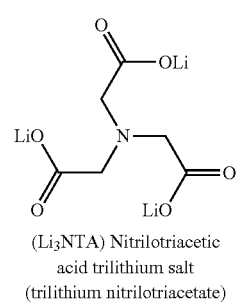

(Li$_3$NTA) Nitrilotriacetic acid trilithium salt
(trilithium nitrilotriacetate)

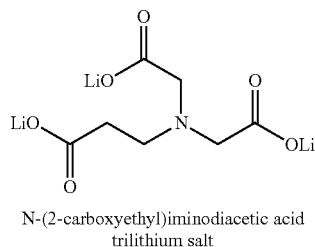

N-(2-carboxyethyl)iminodiacetic acid trilithium salt

Na₃NTA is another example

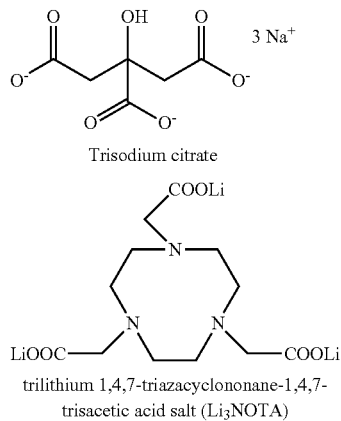

Trisodium citrate trilithium 1,4,7-triazacyclononane-1,4,7-trisacetic acid salt (Li₃NOTA)

1.1.3. Tetradendate

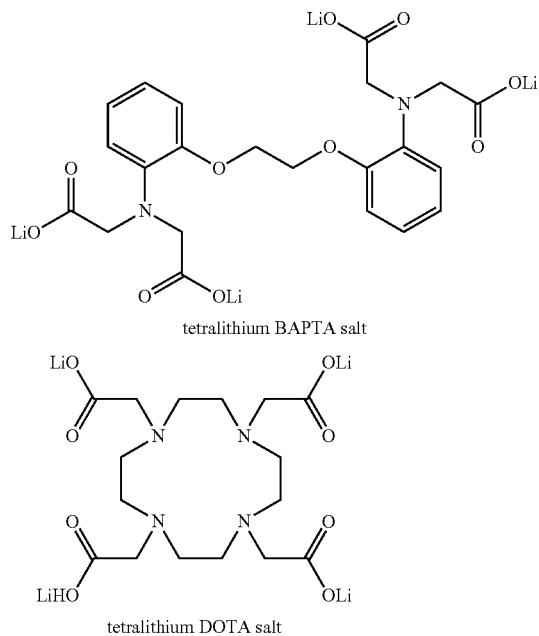

tetralithium BAPTA salt tetralithium DOTA salt

The IUPAC name of Li₄BAPTA salt is tetralithium salt of 1,2-bis(o-amino phenoxy)ethane-N,N,N',N'-tetra acetic acid The IUPAC name of Li₄DOTA salt is tetralithium salt of 1,4,7,10-tetra aza cyclo dodecane-1,4,7,10-tetra acetic acid

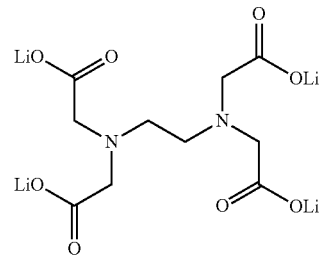

tetralithium salt of ethylenediamine tetraacetic acid (EDTALi₄)

Another tetradentate example is tetrasodium salt of ethylenediamine tetraacetic acid (EDTANa₄).

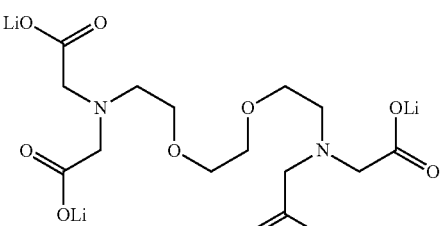

Li₄EGTA (ethyleneglycol-bis-(2-aminoethyl ether)-N, N, N', N'-tetra acetic acid tetralithium salt)

1.1.4. Pentadendate

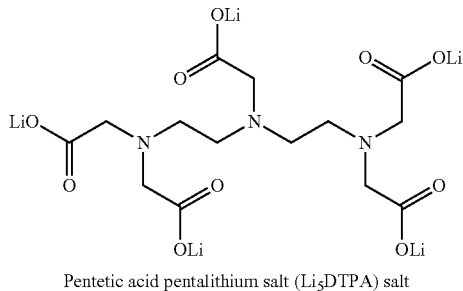

Pentetic acid pentalithium salt (Li₅DTPA) salt

1.1.5. Hexadendate

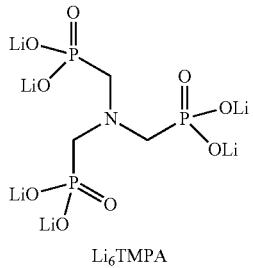

Li₆TMPA

The IUPAC Name of Li₆TMPA is tris(methylene phosphonic acid) hexalithium salt

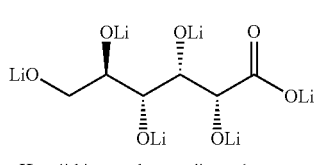

Hexalithium or hexasodium gluconate

1.1.6. Octadentate

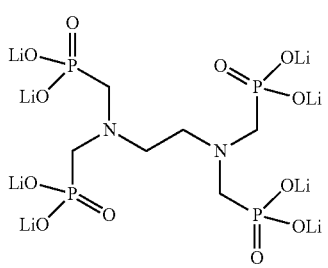

Octalithium ethylene diamine tetramethyl phosphate (Li₈EDTMP)

1.2 Polyamines

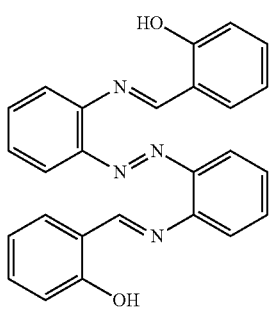

2,2′-Bis(salicylideneamino)azo-benzene

1.3 Thiols

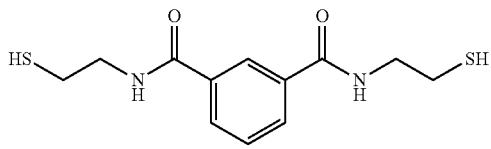

N,N′-bis(2-mercaptoethyl)isophthalamide (BDTH₂)

2. Polymers Functionalized with Alkali Metal (Li, Na, K, and/or Cs) Salts of Organic Acids

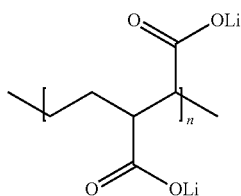

P(E-alt-MALi₂)
Poly(ethylene-alt-maleic acid dilithium salt)

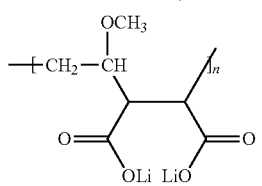

Poly(methyl vinyl ether-alternating-maleate, lithium salt)

-continued

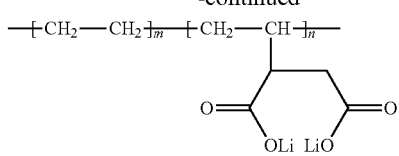

Polyethylene-graft-maleate, lithium salt

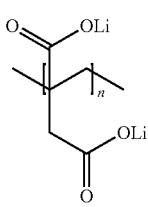 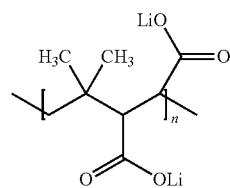

Poly(itaconate, lithium salt) and copolymers

Poly(isobutylene-alternating-maleate, lithium salt)

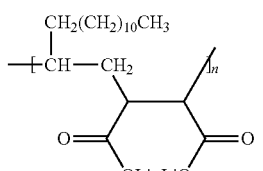 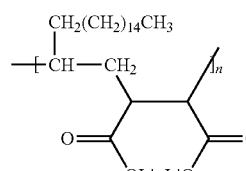

Poly(1-tetradecene-alternating-maleate, lithium salt)

Poly(1-octadecene-alternating-maleate, lithium salt)

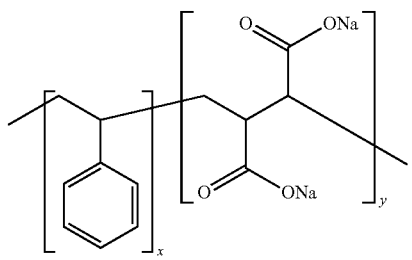

Poly(styrene-maleate disodium salt) copolymer

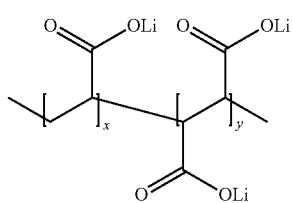

Poly(acrylate, lithium salt-co-maleate, lithium salt)

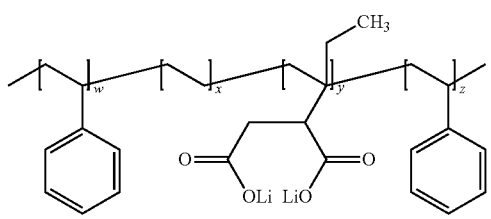

Polystyrene-block-poly(ethylene-random-butylene)-block-polystyrene-graft-maleate, lithium salt 17
-continued

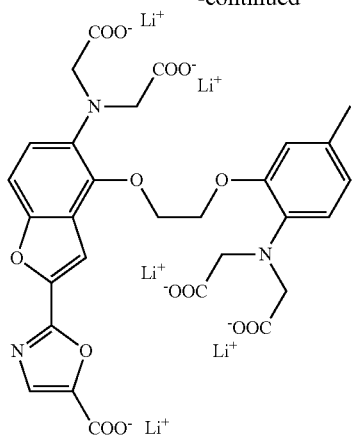

Fura-2 Li salt

18
-continued

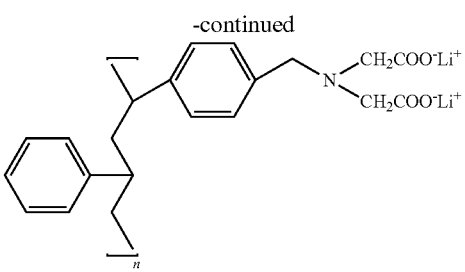

(IDALi$_2$) styrene-divinylbenzene copolymer functionalized with dilithium salt of iminodiacetic acid (IDANa$_2$) styrene-divinylbenzene copolymer functionalized with disodium salt of iminodiacetic acid 3. Polymers Functionalized with Nitrogen Functionalities (Amines and Pyridine)

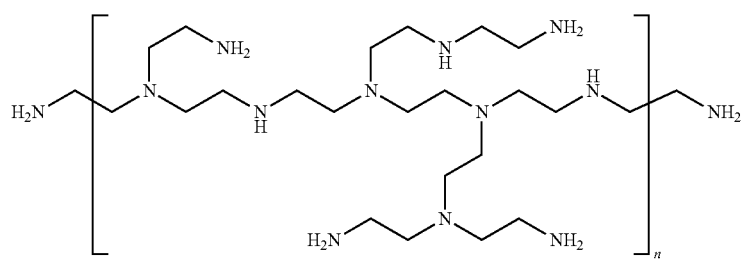

Linear and branched polyethyleneimine (shown), as well as carboxymethylated and carboxyethylated polyethyleneimine

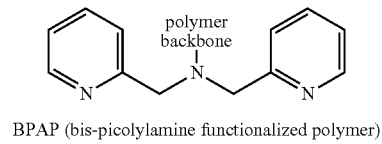

BPAP (bis-picolylamine functionalized polymer)

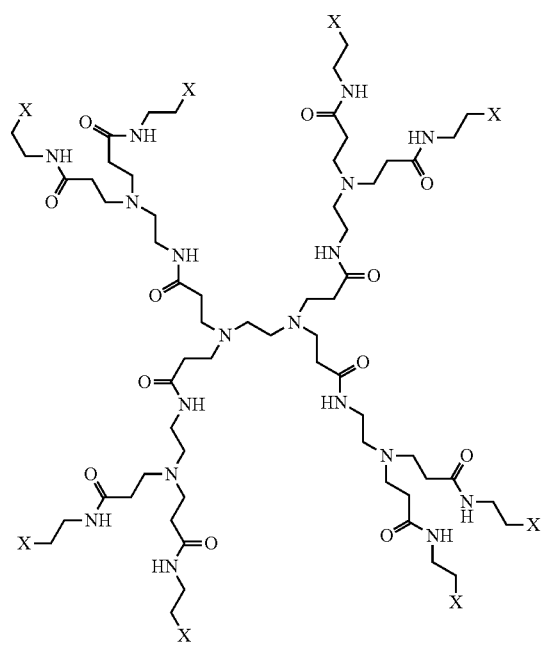

Poly(amidoamine) (PAMAM) dendrimer
G1 PAMAM OH: X = OH
G1 PAMAM NH$_2$: X = NH$_2$

G1 PAMAM OH: X = OH
G1 PAMAM NH$_2$: X = NH$_2$

4. Polymers with Multiple Functional Groups

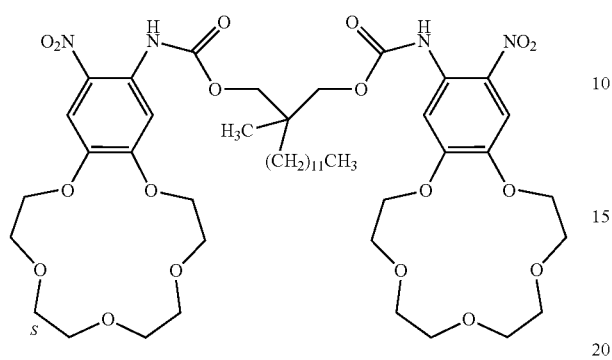

2-dodecyl-2-methyl-1,3-propanediyl bis[N-[5'-nitro(benzo-15-crown-5)-4'yl]carbamate]
(an example of amines plus crown ethers)

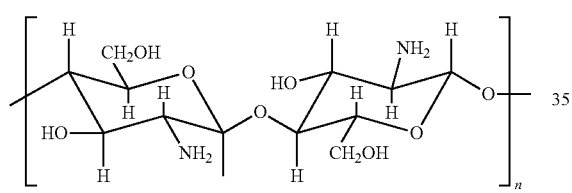

Chitosan (amines and hydroxyl groups)

Carboxymethylated chitosan and carboxyethylated chitosan are also suitable examples of polymers with multiple functional groups.

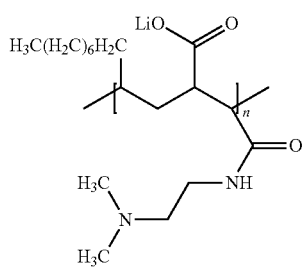

Poly(maleate, lithium salt-alternating-1-decene),
3-(dimethylamino)-1-propylamine derivative

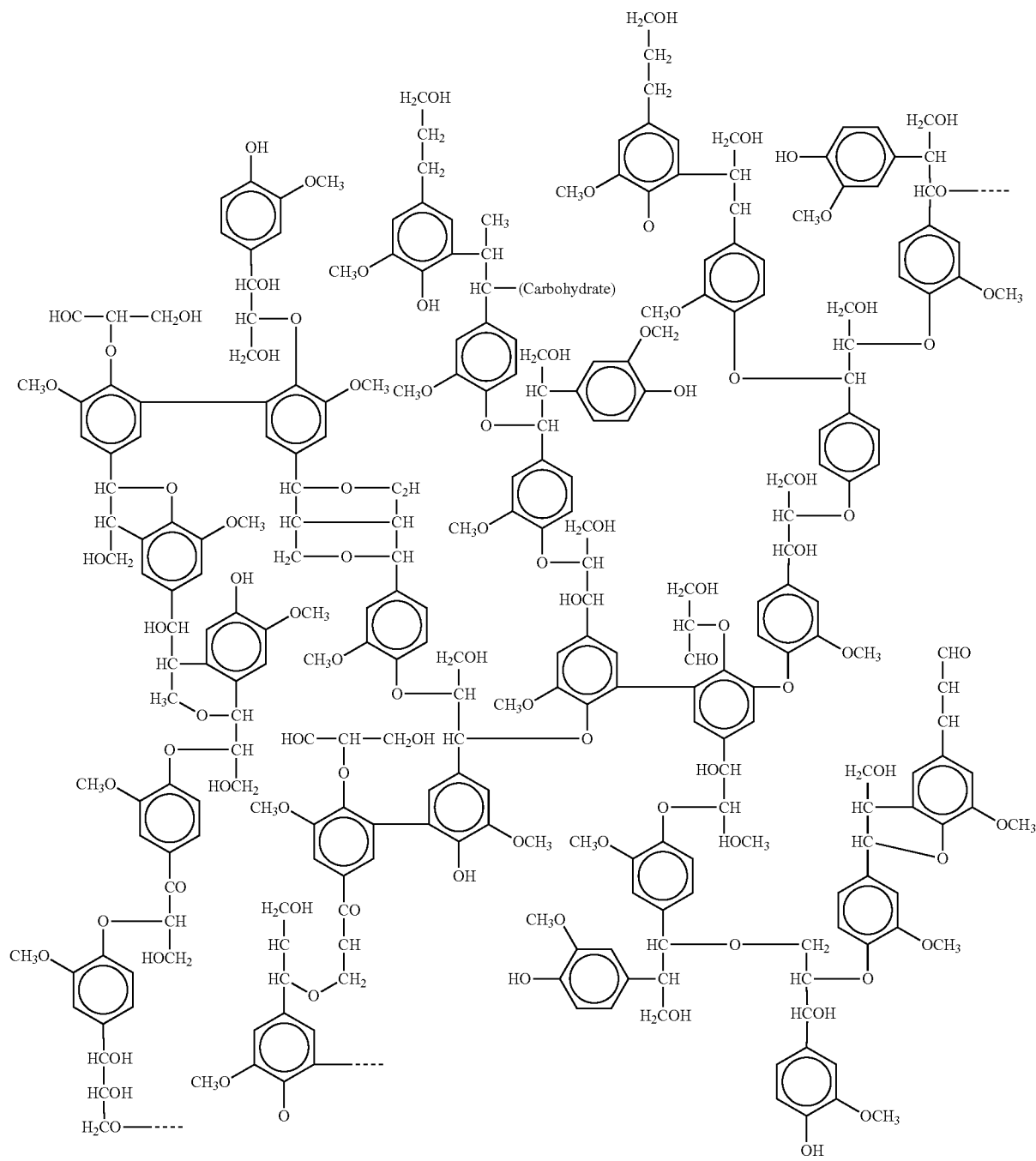
Lignin

Carboxymethylated lignin and carboxyethylated lignin are also suitable examples of polymers with multiple functional groups.

Bactins:

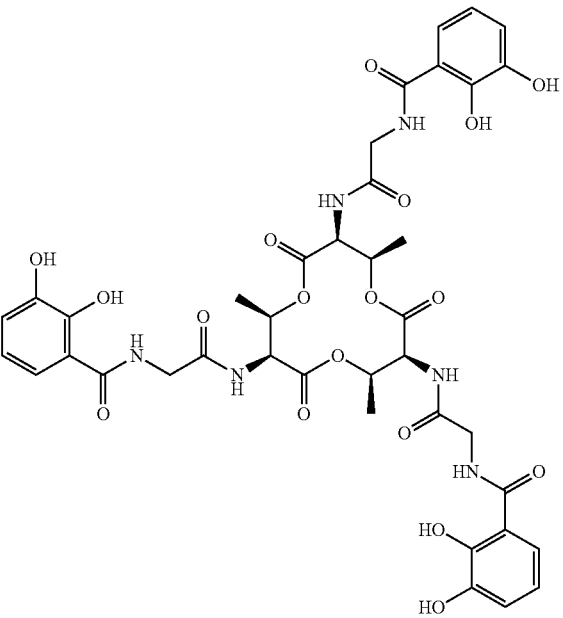

Bacillibactin

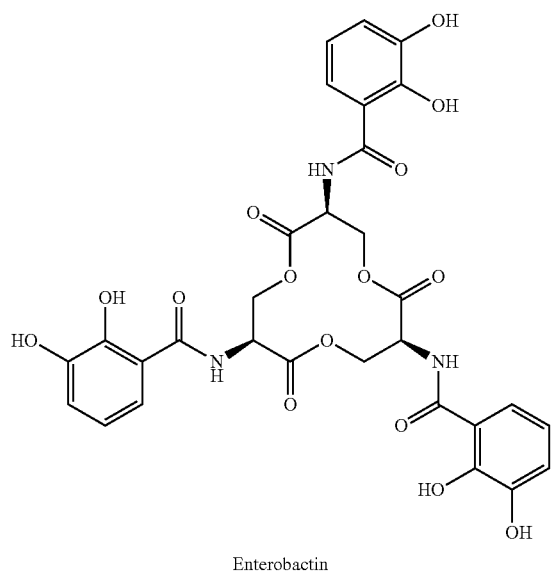

Enterobactin

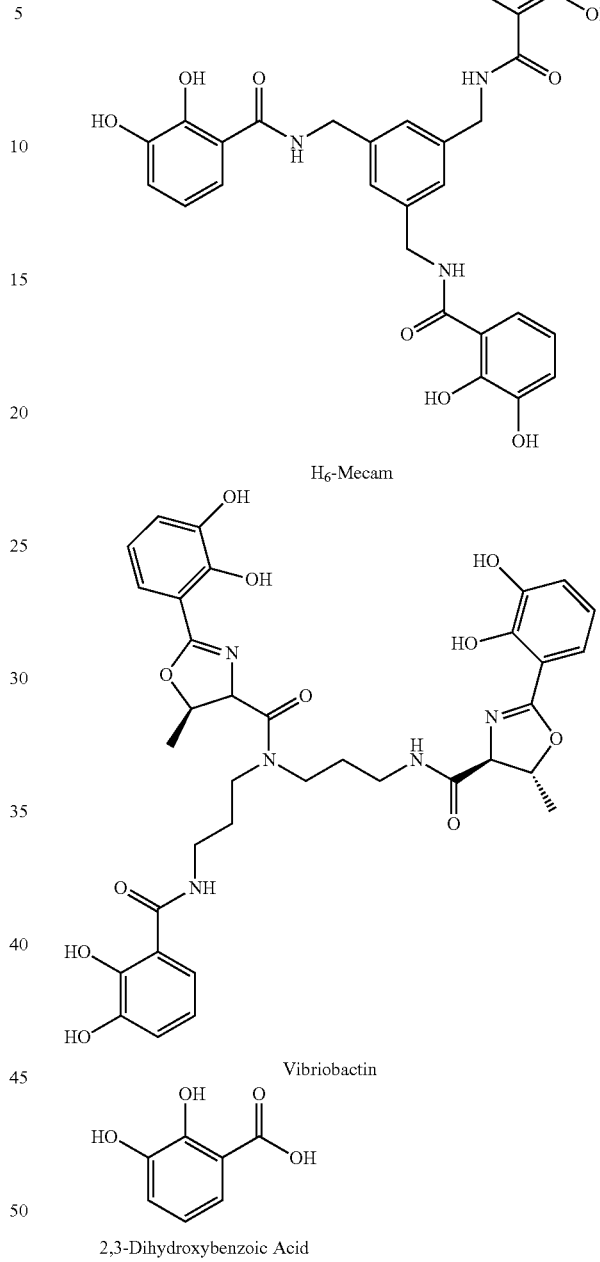

H₆-Mecam

Vibriobactin 2,3-Dihydroxybenzoic Acid

To further illustrate the present disclosure, examples are given herein. It is to be understood that these examples are provided for illustrative purposes and are not to be construed as limiting the scope of the disclosure.

EXAMPLES

Introduction

Examples of a novel multi-functional separator were fabricated by embedding a P(E-alt-MALi₂) cation chelating polymer into a poly(vinylidene fluoride-hexafluoropropylene) (or PVdF-HFP) matrix through a phase-inversion process. Data is shown below on their manganese cation chelating capacity, oxidation limit, and surface and cross-sectional morphologies. Cycling data is also shown for LMO-Li and LMO-graphite coin cells with a 1M $LiPF_6$/EC:DMC (1:1 v/v) electrolyte solution at 30° C. as well as at 55° C., demonstrating that the capacity retention is improved in cells with examples of the functional separator as disclosed herein over cells with a plain separator.

The present inventors show that the majority of the manganese ions dissolved from LMO into the electrolyte solution during the cycling tests are trapped by the maleic functionality of P(E-alt-MALi$_2$), and that both the lithium and the graphite negative electrodes experience greatly reduced manganese contamination. It was also demonstrated that the P(E-alt-MALi$_2$) material is multi-functional, i.e., that the improved capacity retention it affords to LMO-graphite cells is due not only to manganese cations trapping, but also to proton scavenging, which reduces the overall manganese dissolution through acid attack. Apart from the chelation of manganese ions and protons by the functional separator, the separator acts as a source of excess Li$^+$ ions. This helps to decrease the irreversible Li loss during cycling and hence increases the reversible capacity of the cell.

Experimental

Unless otherwise stated, all commercial materials were used throughout this work without further purification or modification, and all work was performed at room temperature (about 25° C.) unless another temperature is specified.
Synthesis and Characterization of the P(E-alt-MALi$_2$) Material The synthetic scheme as well as the chelating mechanism for P(E-alt-MALi$_2$) are shown immediately below.

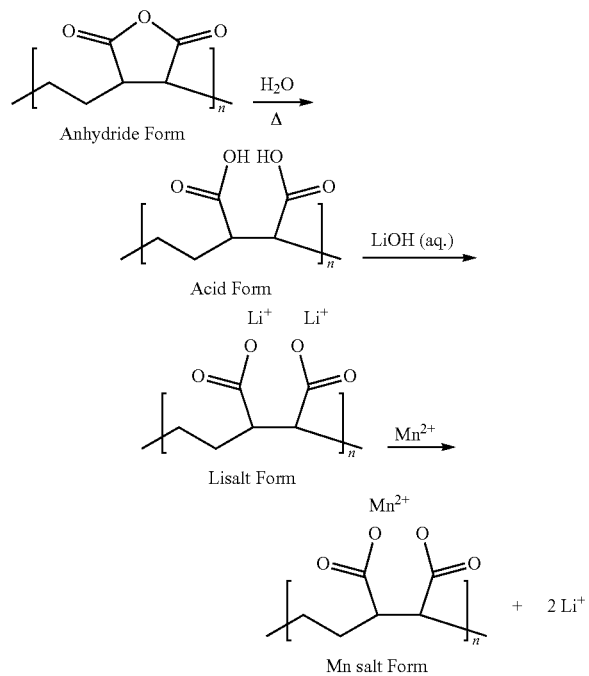

Synthesis and Chelating Mechanism of P(E-Alt-MALi2)

P(E-alt-MALi$_2$) was synthesized by the hydrolysis of poly(ethylene-alt-maleic anhydride) (Sigma Aldrich Cat. No. 188050) with LiOH (Sigma Aldrich Cat No. 442410). A 10 gram amount of poly(ethylene-alt-maleic anhydride) was dissolved in 100 ml of doubly distilled deionized (DD-DI) water and stirred at 40° C. for approximately 14 hours, until a clear solution was obtained, having a pH value of about 7. This solution was then drop-wise added to 100 ml of an aqueous 2M LiOH solution under constant stirring at 30° C., while monitoring its pH. Addition of poly(ethylene-alt-maleic acid) solution was continued until the pH reached a value of 7.5 to 8. The resulting P(E-alt-MALi$_2$) solution was then frozen at −18° C., followed by freeze-drying at −80° C. under <10 mTorr vacuum. A fine P(E-alt-MALi$_2$) powder was prepared by grinding the solid pieces resulting from the freeze-drying process. The resulting powder as well as the poly(ethylene-alt-maleic anhydride) precursor were characterized by FTIR spectroscopy, using a Model iS50 Nicolet instrument equipped with a Ge ATR crystal with 2 cm$^{-1}$ resolution. The disappearance of the peak at 1,775 cm$^{-1}$ (the C=O group in the anhydride), as well as the presence of two peaks at 1,550 cm$^{-1}$ and 1,405 cm$^{-1}$ (both related to the —COOLi$^+$ groups), confirm the complete hydrolysis of poly(ethylene-alt-maleic anhydride).
Fabrication of the Functional Separator Acetone (99.5%, Sigma Aldrich Cat. No. 320110) and dry ethanol (99.8% Sigma Aldrich Cat. No. 32221) were chosen as the matrix ("true") solvent and anti-solvent, respectively, for preparing the functional separator by phase-inversion. Three grams of PVdF-HFP copolymer (Solvay Cat No. 21216) were dissolved in 81 grams of acetone at 35° C., under constant stirring for 3 hours. Dry ethanol (10 grams) was then added drop-wise into the stirred acetone-copolymer solution, until it became transparent. Six grams of finely ground polymeric chelating Li-salt was incorporated into the copolymer blend, and stirring continued for 12 hours at room temperature. The optimized mass compositions of PVdF-HFP copolymer, chelating P(E-alt-MALi$_2$) polymer filler, solvent and anti-solvent in the resulting suspension were 3%, 6%, 81%, and 10%, respectively. The copolymer-filler suspensions were then cast onto glass plates using a doctor blade with a 200 μm gap. The composite membranes were vacuum dried for 14 hours at 80° C., subsequent to the evaporation of the solvent mixture in air. The mass ratio between the copolymer and the filler in the dry matrix of the separator was 1:2, corresponding to a P(E-alt-MALi$_2$) loading of about 2 mg·cm$^{-2}$ in the separator.
Determination of the Chelating Capacity for Manganese Ions Stock solutions with about 15 mM Mn$^{2+}$ and about 7.5 mM Mn$^{3+}$ concentrations were prepared by dissolving, respectively, manganese (II) perchlorate hexahydrate (99% purity, Alfa Aesar Cat No. 359386) and manganese (III) acetate dihydrate (97% purity, Sigma Aldrich Cat No. 215880) in 1M LiPF$_6$/EC:DMC (1:1 v/v) (UBE Inc.). 50 mg amounts of dry chelating material (pristine PE-alt-Li$_2$ powder or pieces of functional separator) were introduced into a 5 ml stock solution contained in polypropylene tubes that were sealed and subsequently stirred for 5 days inside an argon filled glove box. The solids and the solution were then separated by means of an ultra-centrifuge operating at 12,000 RPM. 0.1 ml aliquots from each supernatant were diluted by a factor of 100 in double distilled deionized (DD-DI) water, and their Mn concentrations were determined by inductively coupled plasma optical emission spectroscopy (ICP-OES) using an Ultima 2 instrument from Jobin-Yvon Horiba. Similarly, a 0.1 ml volume of stock solution was diluted by a factor of 100 in DD-DI water, to serve as a reference solution for the ICP-OES measurements. The chelating capacity for $Mn^{3+}$ ions was then determined from the differences between the total manganese contents in the test and in the reference solutions.

Electrode Fabrication, Cell Assembly, and Electrochemical Testing

LMO from Yunan Yuxihuilong Technology Co. Ltd. was used in these experiments. Composite positive electrodes were prepared by spreading a slurry of a mixture of 85 wt % LMO, 10 wt % Super P Li carbon black conductive filler (IMERS Ltd.), 5 wt % PVdF binder (from Solvay) and N-methyl pyrrolidone (NMP, from Sigma Aldrich) as dispersing solvent, onto Al current collectors using a doctor blade with a 100 μm gap, followed by vacuum drying at 120° C. for 14 hours. Composite graphite negative electrodes were prepared in a similar fashion, by doctor-blading a slurry of 90 wt % graphite (from SMG Hitachi Inc), 3 wt % carbon black Super P Li (IMERS Ltd.), 7 wt % PVdF binder (from Solvay), and N-methyl pyrrolidone (NMP, from Sigma Aldrich) as dispersing solvent, onto Cu current collectors. (The mass ratio of composite electrode mass to NMP mass in the slurry was 1:1.) Drying of the electrodes was performed as previously mentioned. Active material loadings were about 10.8 mg cm$^{-2}$ and about 4.5 mg cm$^{-2}$, respectively, on the Al and Cu current collectors. The example functional separator was tested in both LMO/Li and LMO/graphite coin cells (model: 2325, NRC, Canada) containing 1 M LiPF$_6$/EC:DMC (1:1 w/w) electrolyte and 1.4 cm diameter electrodes. Their performance was compared against that of cells containing a baseline separator. The coin cells had either a single layer of functionalized separator or two layers of baseline separator, and electrodes with a geometric area of 2.83 cm$^2$ (1.93 cm diameter). The cells were assembled inside an argon filled glove box with moisture and oxygen levels <1 ppm.

Four formation cycles at C/10 rate were conducted at 30° C. on each cell prior to each cycling test, using an Arbin Model BT2000 multichannel battery cycler. Electrochemical AC impedance measurements were conducted on the cells with a Solartron Instruments 1225 HF frequency response analyzer and a Solartron Instruments 1287 electrochemical interface, both after formation (4 cycles at C/10 rate) and after 100 cycles at C/5 rate, prior to each cell's disassembly. Impedance spectra were collected at open circuit voltage in the discharged state (at about 3 V), with a 5 mV excitation amplitude, over the 100 kHz to 10 mHz frequency range.

All cells were immediately disassembled after the completion of 100 galvanostatic cycles and the associated post-cycling electrochemical AC impedance measurements, to harvest both the electrodes and electrolyte filled separators for further analyses. Mn amounts in the functional separator and in the negative electrodes from both half and full cells were determined by ICP-OES. The Mn ions were eluted from the used separators with 3 M HCl and their concentrations were measured after 100× dilution with DD water. The separators from yet another set of LMO-graphite cells were washed with DMC after the cell disassembly and characterized by FTIR. The Mn contaminated Li electrodes from LMO-Li cells were dissolved by DD-DI water, and the Mn content of the solutions was determined by ICP-OES without any prior dilution. The Cu supported graphite negative electrodes from LMO-graphite cells were dissolved in aqua regia (HCl:HNO$_3$=3:1). The Mn containing aliquots were then diluted by a factor of 100 with DD-DI water, and the Mn concentrations were determined by ICP-OES. In order to assess any structural changes in the LMO material during cycling, X-ray diffraction (XRD) was performed on the positive electrodes from cells with functional as well as baseline separators using a Bruker Inc. (Germany) AXS D8 ADVANCE diffractometer (reflection θ-θ geometry, Cu Kα radiation, receiving slit 0.2 mm, high-resolution energy-dispersive detector), with a 0.5 second/step data collection time and a 0.049° step size. Finally, FTIR spectra were also collected for the functionalized separators in both their pristine (as-prepared) state and after harvesting them from LMO-graphite cells after the high-temperature cycling test, using a Model iS50 Nicolet instrument.

Characterization of the P(E-alt-MALi$_2$) Functional Separator

The chelating capacity for $Mn^{3+}$ cations of the P(E-alt-MALi$_2$) material in powder form and when incorporated in the functional separator was 0.37 and 0.33 mM·g$^{-1}$, respectively; the corresponding numbers for $Mn^{2+}$ cations are 0.56 and 0.51 mM·g$^{-1}$, respectively. The about 10% reduction in chelating capacity for the P(E-alt-MALi$_2$) material when embedded in the separator is likely due to blocking of the chelating groups by the copolymer matrix.

Figure 11A:
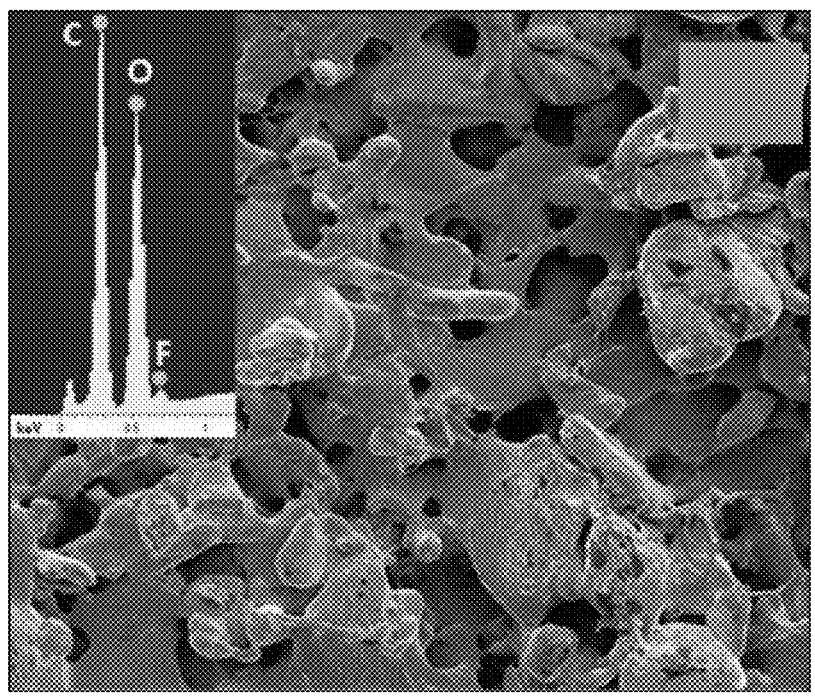
FIGS. 11A and 11B are scanning electron microscope (SEM) images of a functional separator having P(E-alt-MALi$_2$) incorporated therein—surface morphology, with representative Energy-Dispersive X-ray spectroscopy (EDX) profile in the inset (FIG. 11A), and cross-section morphology (FIG. 11B)
Figure 11B:
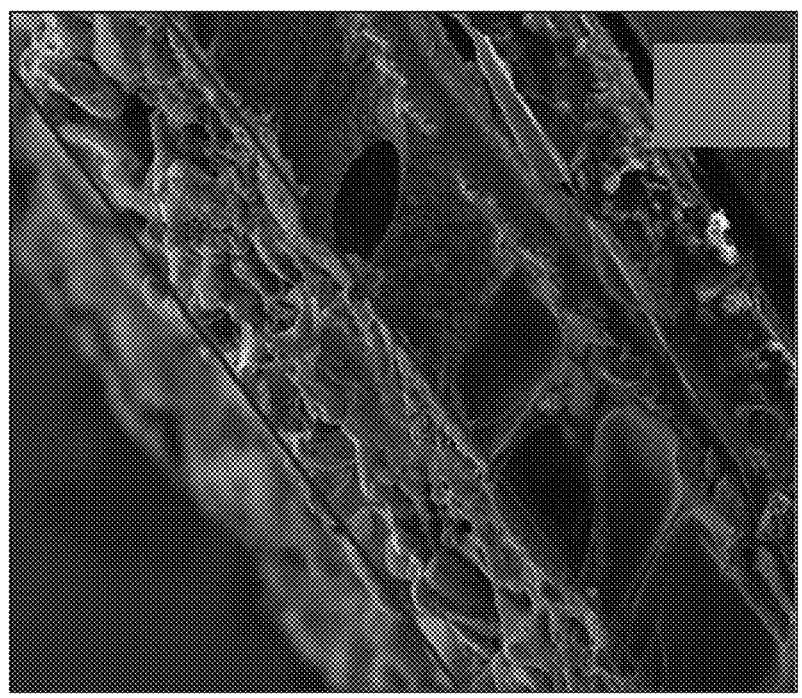

FIGS. 11A and 11B are scanning electron microscope (SEM) images of the functional separator: (A) surface morphology, with representative EDX profile in the inset, and (B) cross-section morphology.

Figure 12:
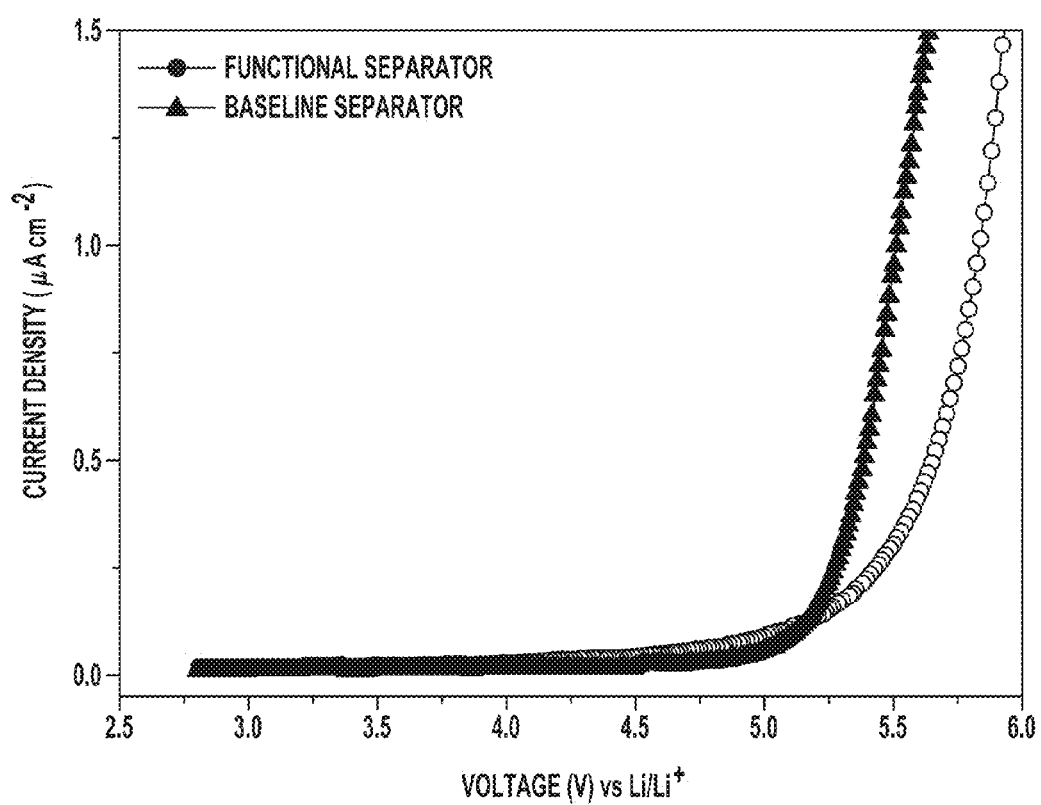
FIG. 12 is a graph showing linear sweep voltammograms recorded in Al—Li cells with an example fabricated functional separator and a commercial polypropylene (Celgard 2500) baseline separator.

The graph in FIG. 12 displays linear sweep voltammetry profiles for the functional and baseline separators. The steep increase in oxidation current which occurs near 5 V vs. Li/Li$^+$ for both separators is due to the passivation of the aluminum current collector and to electrolyte breakdown. Thus, these voltage-current data indicate that the electrochemical stability of the functional separator material is not worse than the oxidative stability limit of the polypropylene Celgard 2500 (baseline) separator or that of the 1M LiPF$_6$/EC:DMC (1:1) electrolyte solution.

Electrochemical Cells Performance and Post-disassembly Analysis Data

Figure 7A:
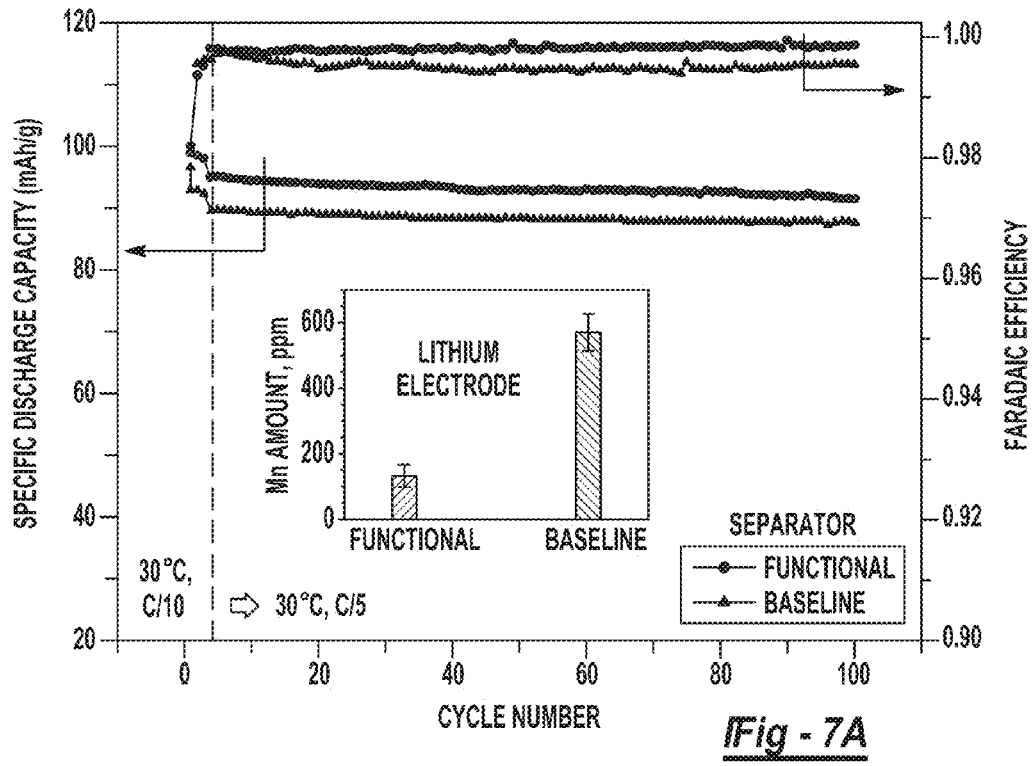
FIGS. 7A-7D are graphs showing specific discharging capacity (in mAh/g, left Y-axis) and Faradaic efficiency (a.k.a. Coulombic efficiency or "current efficiency") (right Y-axis) as a function of cycle number (X-axis) for LMO-Li (FIGS. 7A and 7B) and LMO-graphite (FIGS. 7C and 7D) coin cells containing functional and baseline separators during cycling at C/5 rate, at a temperature of 30° C.
Figure 7B:
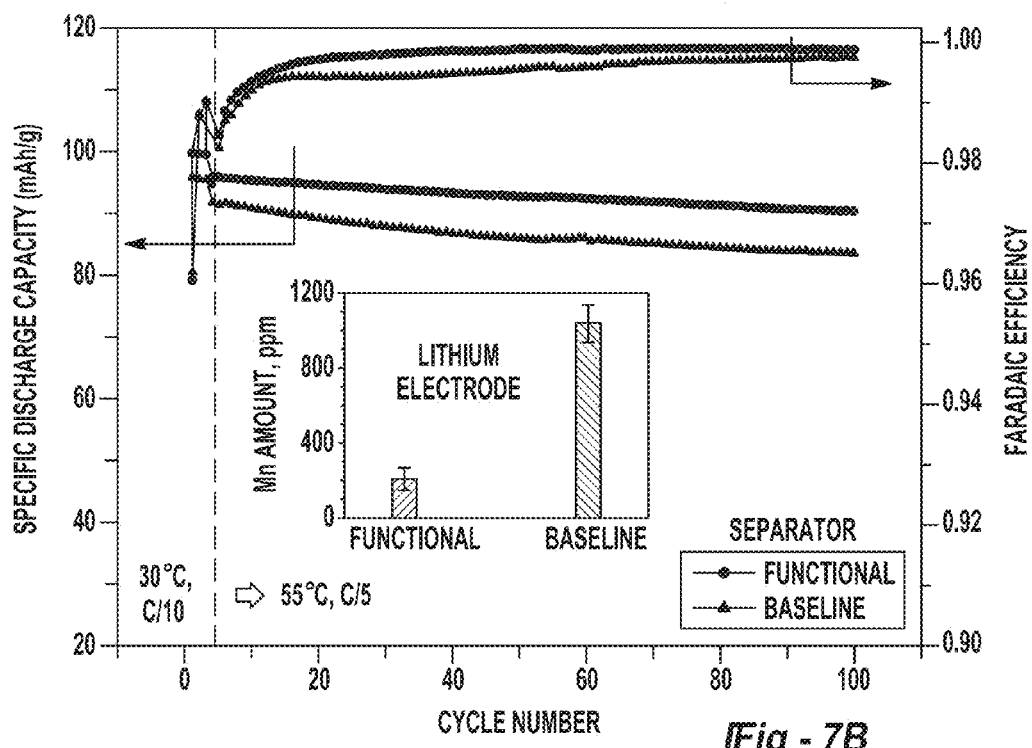
Figure 7C:
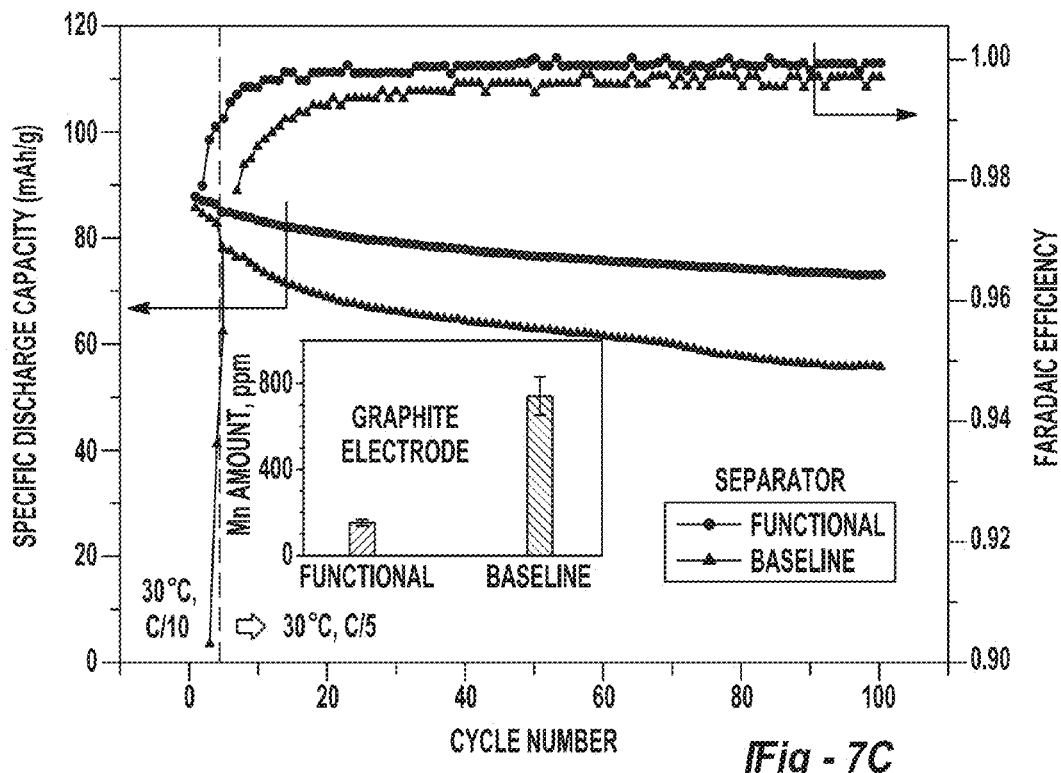
Figure 7D:
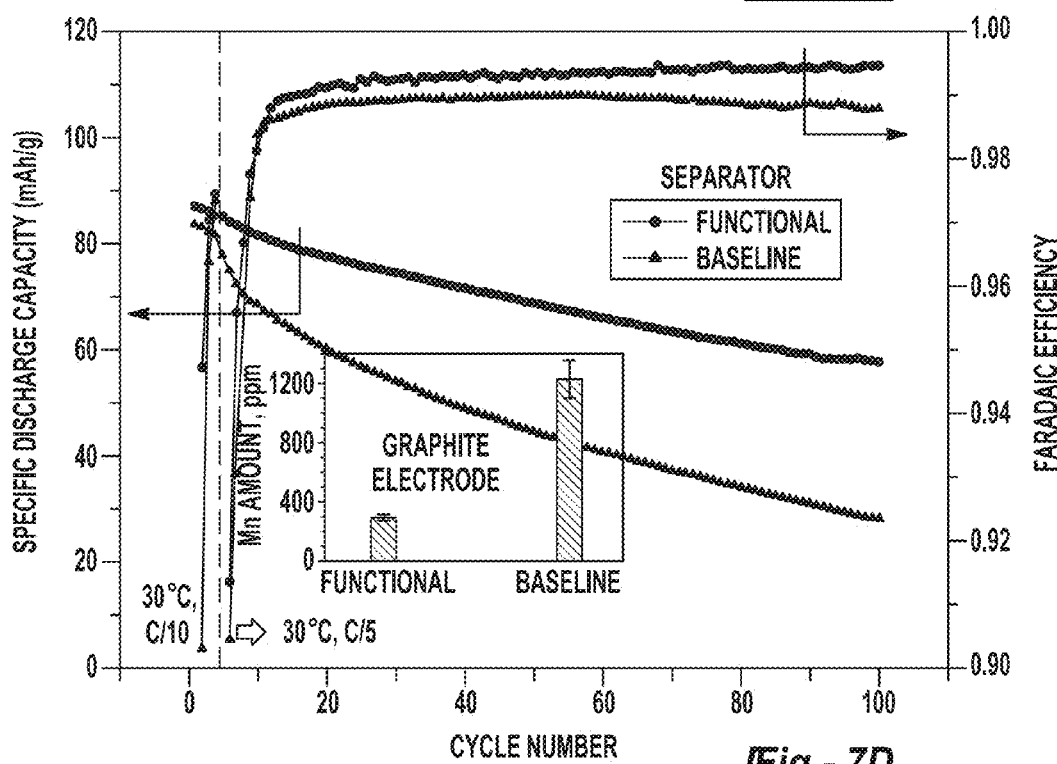

FIGS. 7A-7D display cycling data for LMO-Li and LMO-graphite cells with functional and baseline separators collected at C/5 rate and 30° C. or 55° C. The minimal initial increases in the specific capacity of all cells containing the functional separator over the specific capacity of the corresponding cells with the baseline separator are likely due to the higher electrolyte uptake and the decreased electrolyte resistance of the functionalized separator. FIGS. 7A and 7B indicate only minimal improvements of 4% and 8% in the capacity of LMO-Li cells with a functional separator over baseline cells, after 100 cycles at C/5 rate performed, respectively, at 30° C. or 55° C. On the other hand, FIGS. 7C and 7D show that the LMO-graphite cells with functional separator retain 31% and 100% more capacity than the baseline cells after 100 cycles at 30° C. and 55° C., respectively. Furthermore, the insets in FIGS. 7A-7D show that the ratio between the Mn amount in the negative electrode from cells with plain separators and that in the negative electrode from cells with a functionalized separator, from identical tests, ranges from about 4.4 to about 5, irrespective of test temperature or negative electrode type. These results show the manganese cations chelating ability of the functional separator in operating cells. The improvement in capacity retention upon cycling, while only minimal for cells with metallic Li electrodes, is significantly larger in cells with graphite electrodes, in line with the catalytic effect of manganese deposited on graphite electrodes for performance degradation reactions.

As can be seen in FIGS. 7A and 7B, the LMO-Li cells including the P(E-alt-MALi$_2$) functional separator exhibit:
   4% more capacity after 100 cycles at C/5 rate and 30° C.;
   8% more capacity after 100 cycles at C/5 rate and 55° C.;
   5× less Mn on lithium electrode with the functionalized separator at 30° C.; and
   4.5× less Mn on lithium electrode with the functionalized separator at 55° C.

As can be seen in FIGS. 7C and 7D, the LMO-graphite cells including the P(E-alt-MALi$_2$) functional separator exhibit:
   31% more capacity after 100 cycles at C/5 rate and 30° C.;
   100% more capacity after 100 cycles at C/5 rate and 55° C.;
   9× less Mn on graphite electrode with the functionalized separator at 30° C.; and
   5× less Mn on graphite electrode with the functionalized separator at 55° C.

As a result of the reduced reactivity, the Faradaic efficiency is higher for cells with the functional separator than in cells with the baseline separator, especially at elevated temperature. The initial Faradaic efficiency (FE) is fairly low (about 85% during the very first cycle at 30° C. and C/10 rate in both types of cells) and increases steadily during the formation cycles, reflecting the formation of a stable SEI layer on the graphite negative electrode. At the end of 100 cycles at C/5 rate, the FE for LMO-graphite cells with functional separators is about 0.999 at 30° C. and about 0.994 at 55° C., vs. about 0.996 at 30° C. and about 0.990 at 55° C. for cells with baseline separators. The higher FE indicates that a more stable SEI layer is formed in the former cells compared to the latter ones. Furthermore, the FE of LMO-graphite cells with the baseline separator decreases at 55° C. from cycle 60 onwards, indicating that the SEI becomes increasingly damaged as the cycling proceeds, resulting in a greater reactivity at the graphite electrode. Mn amounts measured after 100 cycles at C/5 rate performed at 30° C. and 55° C. on graphite electrodes from cells with the functional separator, were 1.6 and 3.0 μg·cm$^{-2}$ (or 0.15 and 0.28 μg Mn per mg LMO, respectively), compared to 8.0 and 13.3 μg·cm$^{-2}$ (or 0.74 and 1.23 μg Mn per mg LMO, respectively) for baseline cells. An important finding from these experiments is that the total Mn amount in the separator and negative electrode of a cell with a functional separator is 1.5 times lower than the Mn content in the negative electrode and in the separator of baseline cells. This demonstrates that the functional separator not only prevents the migration of Mn cations to the graphite negative electrode, but also reduces the dissolution rate of manganese from the LMO active material.

Figure 8:
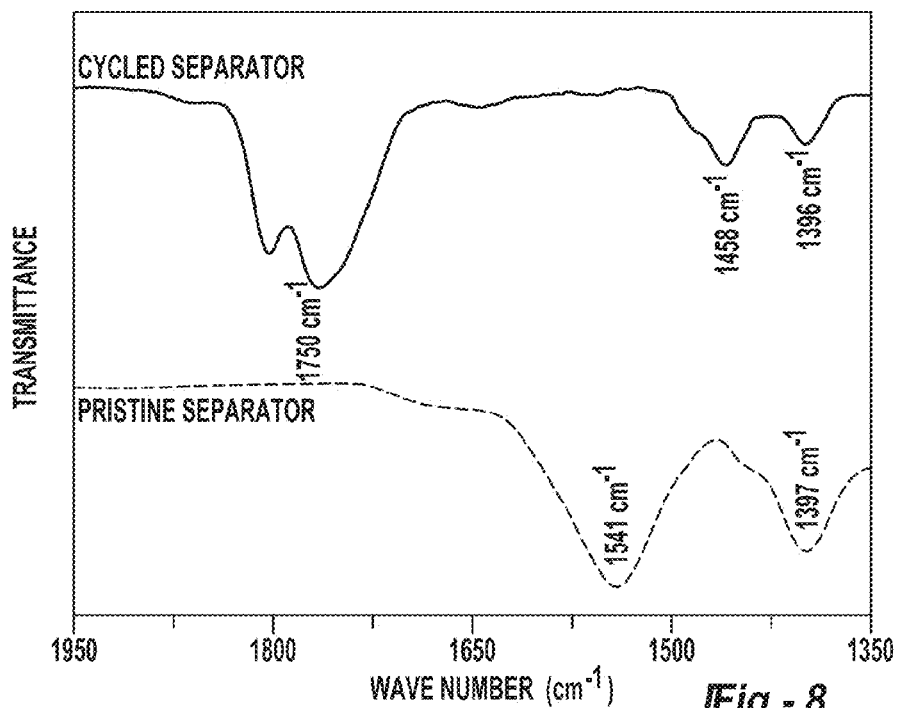
FIG. 8 is a graph showing comparative FTIR spectra (transmittance in arbitrary units vs. wave number in $cm^{-1}$) for a functional separator in its pristine state and from a cycled cell.

FIG. 8 displays FTIR (Fourier Transform Infra-Red) spectra for functional separators in their pristine state and after high temperature cycling. Note that the data for the separator from the cycled cell displays a strong carboxylic acid peak at 1,750 cm$^1$, that is absent in the pristine separator. The explanation for this observation is the re-protonation of carboxylic acid dilithium salt groups due to the presence of HF, obtained from the decomposition of the LiPF$_6$ salt by the trace water impurity in the electrolyte solution. Since HF attack is the main cause for the transition metal ion dissolution from positive active materials, and the functional separator reduces the HF amount in the cells by protonating the carboxylic acid group, the Mn dissolution will also be reduced. The proposed protonation mechanism and consequent reduction of HF amount in the electrolyte solution is confirmed in the experiments by the 33% (or 1.5×) reduction of the total Mn found outside the positive electrodes of cells with functional separators compared to cells with baseline separators, as previously described. Thus, besides chelating Mn cations, the lithiated maleic acid groups in the functionalized separator also act as proton scavenger and thus reduce to some extent the dissolution of transition metal ions from the positive electrode.

Conclusions with Regard to Poly(Ethylene-alt-maleic Acid) Dilithium Salt Chelating Agent Example multifunctional separators for Li-ion batteries were fabricated using a phase-inversion technique, with poly(ethylene-alt-maleic acid) dilithium salt as a functional filler material and PVdF-HFP copolymer as an inert matrix material. Both the LMO-Li and the LMO-graphite cells containing the functional separator exhibited only minor impedance increases compared to cells containing the baseline separator. Mn amounts found in negative electrodes after 100 cycles at C/5 rate were at least 4.4× to 5× smaller for cells with the functional separator than in baseline cells with a commercial polyolefin separator, irrespective of the negative electrode material (whether Li or graphite), and of the cycling temperature. Furthermore, the total Mn amount dissolved from the positive LMO electrode in cells with a functional separator during cycling tests was 1.5× lower than in baseline cells. The performance improvements afforded by examples of the multifunctional separator are most prominent in LMO-graphite cell cycling data, with about 31% and about 100% more capacity retained over baseline cells with a plain commercial separator, after 100 cycles performed at 30° C. and 55° C., respectively. The benefits afforded by this functional separator may be traced back to three important functions performed by the P(E-alt-MALi2) material: chelating of dissolved Mn ions, a reservoir of additional Li+ ions, and proton scavenging.

Preparation of Further Example Separators

Type A=BPAP=polymeric amino-bis-methylpyridine with the following chemical structure:

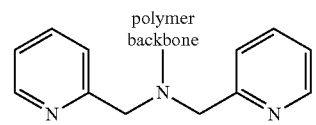 [SMILES: CN(Cc1ccccn1)Cc1ccccn1]

Type B=PEA=polyethyleneimine functionalized polymer, with the following chemical structure:

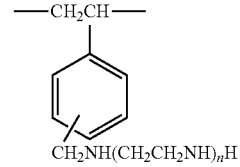

Type C=EDTA Na$_4$=tetrasodium salt of ethylenediamine tetraacetic acid

Further chelating separators were fabricated using a phase-inversion technique with acetone (Sigma Aldrich) as a true solvent. Two kinds of phase-inversion separators were fabricated based on two anti-solvents: with water for Type-A and B materials, and dry ethanol (Sigma Aldrich) for Type-C material. As the Type-C material is soluble in water, water cannot be used as the anti-solvent in the phase-inversion method. Three grams of poly(vinylidene fluoride-hexafluoropropylene) (PVdF-HFP) copolymer (Solvay) was dissolved in 81 grams of acetone at 35° C., under constant stirring for 3 hours. Water or dry ethanol (10 g) was then added drop-wise into the stirred acetone-copolymer solution, until it became transparent. Six grams of finely grinded chelating materials were incorporated into the copolymer blend, and stirring continued 12 hours at room temperature. Then the copolymer-filler suspensions were cast on glass plates using a doctor blade with a 200 μm gap. The composite membranes were then dried for 14 hours at 80° C. under vacuum, subsequent to the evaporation of the solvent mixture in air. The final mass composition in the dry separator membranes was 1:2 for copolymer and filler, respectively, and therefore the loading of the chelating fillers (chelating agent as a filler) in the separators was about 2 mg $cm^2$.

Electrochemical Cells Performance with Further Example Separators

Figure 9A:
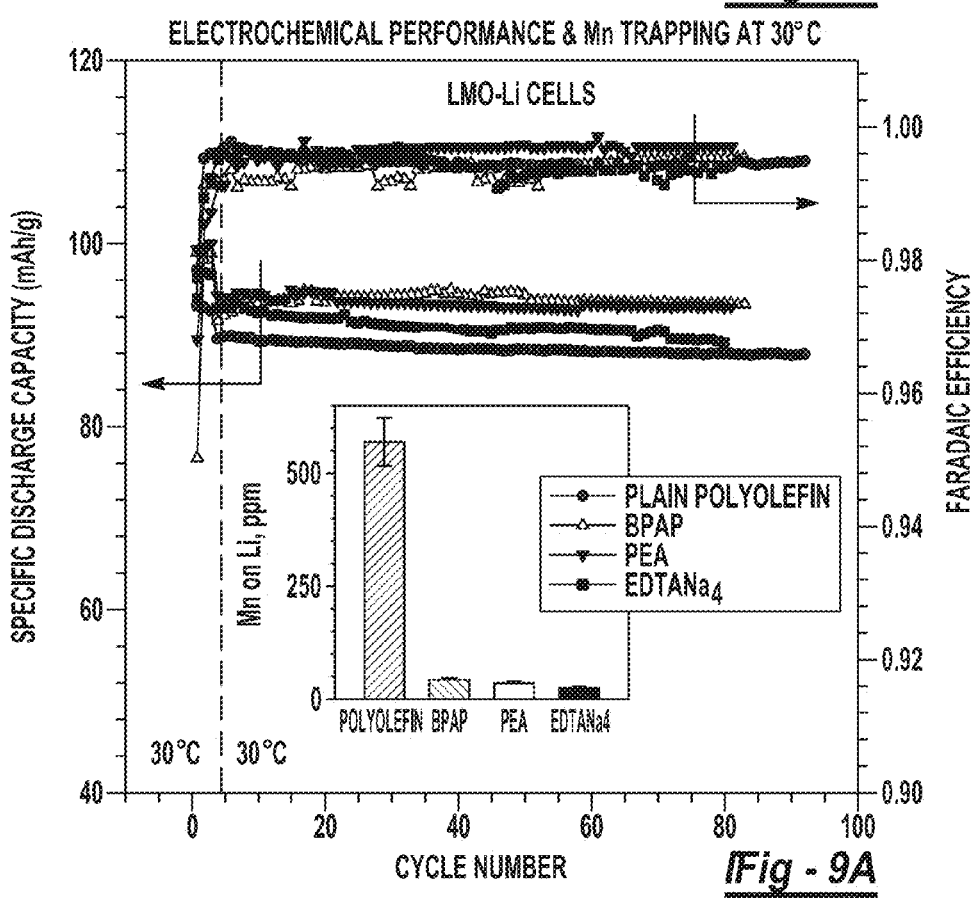
FIGS. 9A and 9B are graphs showing specific discharging capacity (in mAh/g, left Y-axis) and Faradaic efficiency (Coulombic efficiency) (right Y-axis) as a function of cycle number (X-axis) for LMO-Li coin cells containing a 1.0 M (1:1 v/v) electrolyte solution of lithium hexafluorophosphate ($LiPF_6$) in ethylene carbonate (EC) and dimethyl carbonate (DMC) (1.0 M $LiPF_6$ EC/DMC), and containing a plain polyolefin separator and separators including examples of the chelating agents disclosed herein, during cycling at C/5 rate, at a temperature of 30° C.
Figure 9B:
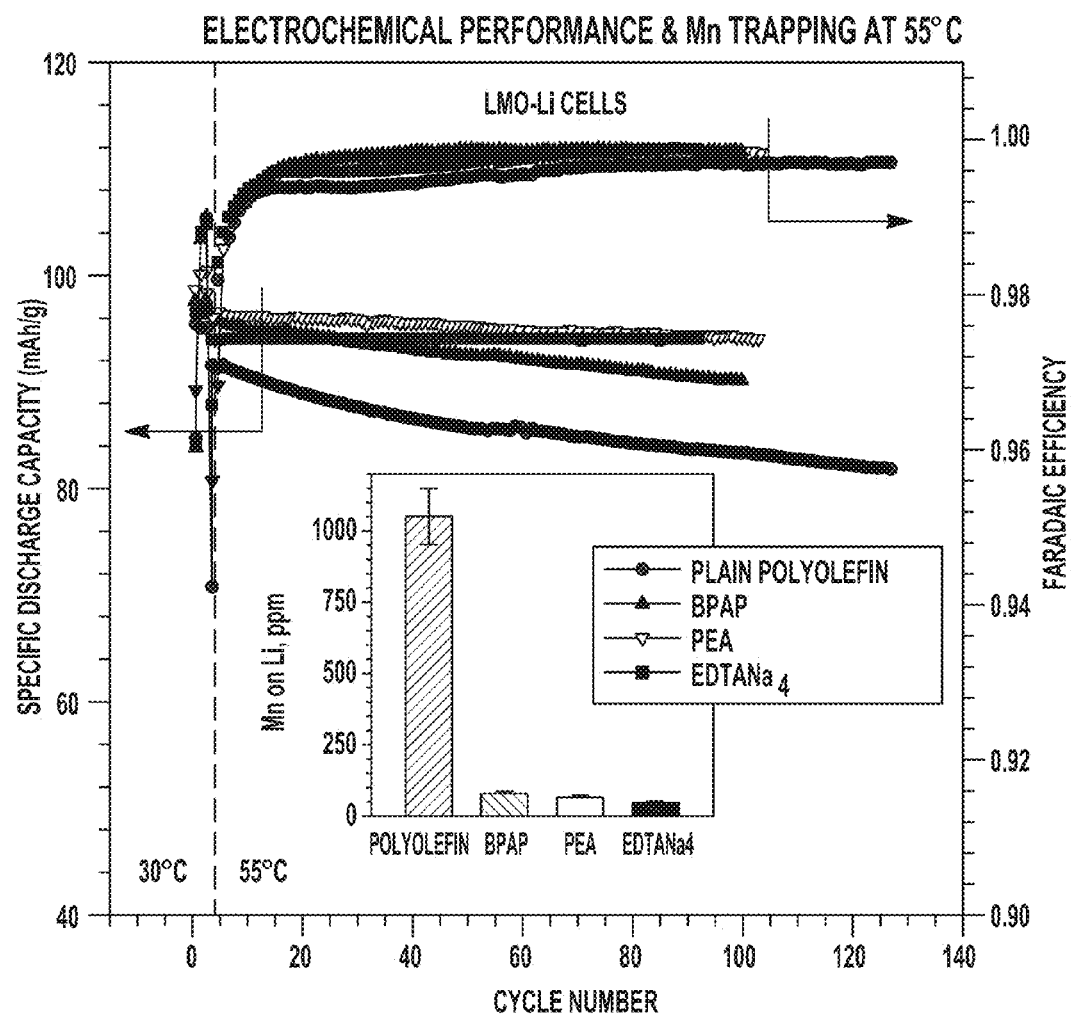

FIGS. 9A and 9B are graphs showing specific discharging capacity and Faradaic efficiency as a function of cycle number for LMO-Li coin cells containing a 1.0 M (1:1 v/v) electrolyte solution of lithium hexafluorophosphate ($LiPF_6$) in ethylene carbonate (EC) and dimethyl carbonate (DMC) (1.0 M $LiPF_6$ EC/DMC), and containing a plain polyolefin separator and separators including the Type A, B and C chelating agents during cycling at C/5 rate, at a temperature of 30° C. (FIG. 9A) and 55° C. (FIG. 9B). The histograms in the insets show the manganese amounts in ppm (normalized to the LMO mass i.e., g Mn per mg LMO) found on the negative electrodes after 30 days.

As can be seen in FIGS. 9A and 9B, the cells including the BPAP, PEA or $EDTANa_4$ functional separators exhibit:

6% more capacity after 100 cycles at C/5 rate and 30° C. with BPAP or PEA;

15% and 10% more capacity, respectively, after 30 days of cycling at C/5 rate and 55° C. with BPAP or PEA, and $EDTANa_4$ functionalized separators;

11×, 14× and 16× less Mn on lithium electrode, respectively, with the BPAP, PEA and $EDTANa_4$ functionalized separators at 30° C.; and 13×, 15× and 21× less Mn on lithium electrode, respectively, with the BPAP, PEA and $EDTANa_4$ functionalized separator at 55° C.

Figure 10A:
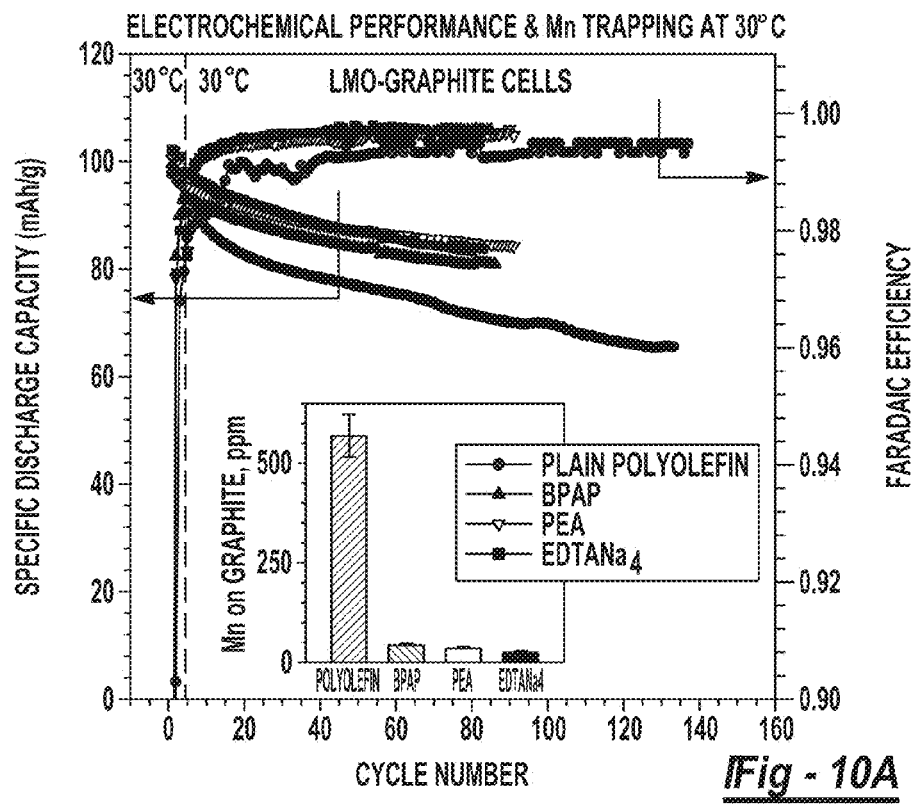
FIGS. 10A and 10B are graphs showing specific discharging capacity (in mAh/g, left Y-axis) and Faradaic efficiency (Coulombic efficiency) (right Y-axis) as a function of cycle number (X-axis) for LMO-graphite coin cells containing a 1 M (1:1 v/v) electrolyte solution of $LiPF_6$ EC/DMC, and containing a plain polyolefin separator and separators including examples of the chelating agents disclosed herein during cycling at C/5 rate, at a temperature of 30° C.
Figure 10B:
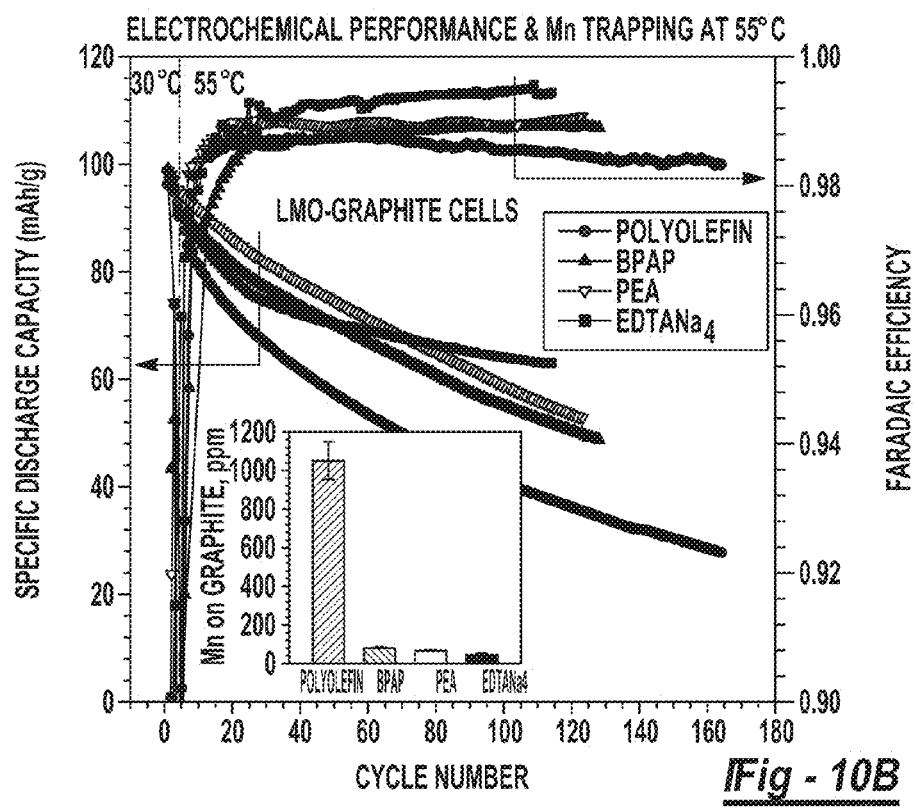

FIGS. 10A and 10B are graphs showing specific discharging capacity and Faradaic efficiency as a function of cycle number for LMO-graphite coin cells containing a 1 M (1:1 v/v) electrolyte solution of $LiPF_6$ EC/DMC), and containing a plain polyolefin separator and separators including the Type A, B and C chelating agents during cycling at C/5 rate, at a temperature of 30° C. (FIG. 10A) and 55° C. (FIG. 10B). The histograms in the insets show the manganese amounts in ppm (normalized to the LMO mass) found on the negative electrodes after 30 days.

At 30° C., at EOT (=end of test), cells with materials A, B, and C retained 22%, 26% and 27% more capacity than the baseline cells, while at 55° C. and EOT, cells with materials A, B, and C, retained 75%, 89% and 125% more capacity than the baseline cells.

It is to be understood that the ranges provided herein include the stated range and any value or sub-range within the stated range. For example, a range from about 0.05% to about 5% should be interpreted to include not only the explicitly recited limits of about 0.05% to about 5%, but also to include individual values, such as 0.07%, 3.5%, etc., and sub-ranges, such as from about 0.25% to about 4%, etc.

Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

The invention claimed is:

1. A lithium ion battery, comprising:
a positive electrode including a binder material;
a negative electrode including a binder material;
a nanoporous or microporous polymer separator soaked in an electrolyte solution, the nanoporous or microporous polymer separator operatively disposed between the positive electrode and the negative electrode; and
one or more chelating agents to complex with transition metal ions in a manner sufficient to not affect movement of lithium ions across the nanoporous or microporous polymer separator during operation of the lithium ion battery;
wherein the one or more chelating agents are at least one of: dissolved or dispersed in the electrolyte solution; grafted onto the polymer of the nanoporous or microporous polymer separator as a substitute pendant group; attached to the binder material of the negative electrode; attached to the binder material of the positive electrode; disposed within pores of the separator; coated on a surface of the separator; coated on a surface of the negative electrode; and coated on a surface of the positive electrode;
wherein the one or more chelating agents are selected from: ion traps in molecular form selected from the group consisting of: polyamines, thiols, alkali metal salts of organic acids, and combinations thereof; polymers functionalized with alkali metal salts of organic acids; polymers functionalized with nitrogen-containing functional groups; polymers functionalized with two or more functional groups; and combinations thereof;
wherein the alkali metal salts of organic acids are multidentate structures selected from any of: tridentate structures selected from the group consisting of trisodium citrate, nitrilotriacetic acid trilithium salt ($Li_3NTA$), nitrilotriacetic acid trisodium salt ($Na_3NTA$), N-(2-carboxyethyl)iminodiacetic acid trilithium salt, trilithium 1,4,7-triazacyclononane-1,4,7-trisacetic acid salt ($Li_3NOTA$), and combinations thereof; tetradentate structures selected from the group consisting of tetralithium salt of 1,2-bis(o-aminophenoxy)ethane-N,N,N', N'-tetra acetic acid ($Li_4BAPTA$), tetralithium salt of 1,4,7,10-tetra aza cyclo dodecane-1,4,7,10-tetra acetic acid ($Li_4DOTA$), tetrasodium salt of ethylenediamine tetraacetic acid ($EDTANa_4$), ethyleneglycol-bis-(2-aminoethyl ether)-N, N, N', N'-tetra acetic acid tetralithium salt ($Li_4EGTA$), and combinations thereof; a pentadentate structure comprising pentetic acid pentalithium salt ($Li_5DTPA$); hexadentate structures selected from the group consisting of hexalithium gluconate, hexasodium gluconate, $Li_6TMPA$ is tris(methylene phosphonic acid) hexalithium salt, and combinations thereof; and an octadentate structure comprising octalithium ethylene diamine tetramethyl phosphate ($Li_8EDTMP$);

wherein the polyamine is 2,2'-bis(salicylideneamino) azobenzene;

wherein the polymers functionalized with nitrogen-containing functional groups are selected from the group consisting of linear polyethyleneimine, branched polyethyleneimine, carboxyethylated polyethyleneimine, carboxymethylated polyethyleneimine, bis-picolylamine functionalized polymer, poly(amidoamine) dendrimer, and combinations thereof; and wherein the polymers functionalized with two or more functional groups are selected from the group consisting of carboxymethylated chitosan; carboxyethylated chitosan; poly(maleate, lithium salt-alternating-1-decene), 3-(dimethylamino)-1-propylamine; lignin, carboxymethylated lignin, carboxyethylated lignin, 2,3-dihydroxybenzoic acid, and combinations thereof.

2. The lithium ion battery as defined in claim 1 wherein the polymer of the nanoporous or microporous polymer separator is selected from the group consisting of polypropylene (PP), polyethylene (PE), a blend of PE and PP, multi-layered structured porous films of at least one of PE and PP, polyethylene terephthalate (PET), polyvinylidene fluoride (PVdF), polyamides, polyurethanes, polycarbonates, polyesters, polyetheretherketones (PEEK), polyethersulfones (PES), polyimides (PI), polyamide-imides, polyethers, polyoxymethylene, polybutylene terephthalate, polyethylenenaphthenate, polybutene, polymethylpentene, polyolefin copolymers, acrylonitrile-butadiene styrene copolymers (ABS), polystyrene copolymers, polymethylmethacrylate (PMMA), polysiloxane polymers, polybenzimidazole (PBI), polybenzoxazole (PBO), polyphenylenes, polyarylene ether ketones, polyperfluorocyclobutanes, polyvinylidene fluoride copolymers and terpolymers, polyvinylfluoride, polyaramides, polyphenylene oxide, cellulosic materials, meso-porous silica, and combinations thereof.

3. The lithium ion battery as defined in claim 1 wherein the thiol is N,N'-bis(2-mercaptoethyl)isophthalamide ($BDTH_2$).

4. The lithium ion battery as defined in claim 1 wherein the polymers functionalized with alkali metal salts of organic acids are selected from the group consisting of poly(ethylene-alt-maleic acid dilithium salt), poly(methyl vinyl ether-alternating-maleate, lithium salt), poly(ethylene-graft-maleate, lithium salt), poly(itaconate, lithium salt), copolymers of poly(itaconate, lithium salt), poly(isobutylene-alternating-maleate, lithium salt), poly(1-tetradecene-alternating-maleate, lithium salt), poly(1-octadecene-alternating-maleate, lithium salt), poly(styrene-maleate disodium salt) copolymer, poly(acrylate, lithium salt-co-maleate, lithium salt), polystyrene-block-poly(ethylene-random-butylene)-block-polystyrene-graft-maleate, lithium salt, fura-2 lithium salt, styrene-divinylbenzene copolymer functionalized with dilithium salt of iminodiacetic acid, styrene-divinylbenzene copolymer functionalized with disodium salt of iminodiacetic acid, and combinations thereof.

5. The lithium ion battery as defined in claim 1 wherein the one or more chelating agents are selected from the group consisting of poly(ethylene-alt-maleate), alkali metal salts of carboxymethylated chitosan, alkali metal salts of carboxyethylated chitosan, polyethyleneimine, alkali metal salts of carboxymethylated polyethyleneimine, alkali metal salts of carboxyethylated polyethyleneimine, lignin, and combinations thereof.

6. The lithium ion battery as defined in claim 1 wherein the one or more chelating agents are selected from the group consisting of poly(ethylene-alt-maleic acid dilithium salt), natural lignin, chemically modified lignin, and combinations thereof.

7. The lithium ion battery as defined in claim 1 wherein the one or more chelating agents are selected from the group consisting of poly(ethylene-alt-maleic acid dilithium salt), BPAP (bis-picolylamine functionalized polymer), polyethyleneimine, tetrasodium salt of ethylenediamine tetraacetic acid ($EDTANa_4$), and combinations thereof.

8. The lithium ion battery as defined in claim 1 wherein the transition metal ions comprise nickel ions, cobalt ions, chromium ions, manganese ions, iron ions, vanadium ions, and combinations thereof.

9. A lithium ion battery separator, comprising:
a nanoporous or microporous membrane; and
one or more chelating agents operatively disposed within pores of the membrane, tethered to a ceramic material of the membrane, grafted onto a polymer of the membrane as a substitute pendant group, or included as a filler material within a polymer separator matrix, the one or more chelating agents to complex with transition metal ions in a manner sufficient to not affect movement of lithium ions across the separator during operation of the lithium ion battery;

wherein the one or more chelating agents are selected from: ion traps in molecular form selected from the group consisting of: polyamines, thiols, and alkali metal salts of organic acids; polymers functionalized with alkali metal salts of organic acids; polymers functionalized with nitrogen-containing functional groups; and polymers functionalized with two or more functional groups;

wherein the alkali metal salts of organic acids are multidentate structures selected from any of: tridentate structures selected from the group consisting of trisodium citrate, nitrilotriacetic acid trilithium salt ($Li_3NTA$), nitrilotriacetic acid trisodium salt ($Na_3NTA$), N-(2-carboxyethyl)iminodiacetic acid trilithium salt, trilithium 1,4,7-triazacyclononane-1,4,7-trisacetic acid salt ($Li_3NOTA$), and combinations thereof; tetradentate structures selected from the group consisting of tetralithium salt of 1,2-bis(o-aminophenoxy)ethane-N,N,N', N'-tetra acetic acid ($Li_4BAPTA$), tetralithium salt of 1,4,7,10-tetra aza cyclo dodecane-1,4,7,10-tetra acetic acid ($Li_4DOTA$), tetrasodium salt of ethylenediamine tetraacetic acid ($EDTANa_4$), ethyleneglycol-bis-(2-aminoethyl ether)-N, N, N', N'-tetra acetic acid tetralithium salt ($Li_4EGTA$), and combinations thereof; a pentadentate structure comprising pentetic acid pentalithium salt ($Li_5DTPA$); hexadentate structures selected from the group consisting of hexalithium gluconate, hexasodium gluconate, $Li_6TMPA$ is tris(methylene phosphonic acid) hexalithium salt, and combinations thereof; and an octadentate structure comprising octalithium ethylene diamine tetramethyl phosphate ($Li_8EDTMP$);

wherein the polyamine is 2,2'-bis(salicylideneamino) azobenzene;

wherein the polymers functionalized with nitrogen-containing functional groups are selected from the group consisting of linear polyethyleneimine, branched polyethyleneimine, carboxyethylated polyethyleneimine, carboxymethylated polyethyleneimine, bis-picolylamine functionalized polymer, poly(amidoamine) dendrimer, and combinations thereof; and wherein the polymers functionalized with two or more functional groups are selected from the group consisting of carboxymethylated chitosan; carboxyethylated chitosan; poly(maleate, lithium salt-alternating-1-decene), 3-(dimethylamino)-1-propylamine; lignin, carboxymethylated lignin, carboxyethylated lignin, 2,3-dihydroxybenzoic acid, and combinations thereof.

10. The lithium ion battery separator as defined in claim 9 wherein:

the thiol is N,N'-bis(2-mercaptoethyl)isophthalamide (BDTH$_2$); and the polymers functionalized with alkali metal salts of organic acids are selected from the group consisting of poly(ethylene-alt-maleic acid dilithium salt), poly(methyl vinyl ether-alternating-maleate, lithium salt), poly(ethylene-graft-maleate, lithium salt), poly(itaconate, lithium salt), copolymers of poly(itaconate, lithium salt), poly(isobutylene-alternating-maleate, lithium salt) poly(1-tetradecene-alternating-maleate, lithium salt), poly(1-octadecene-alternating-maleate, lithium salt), poly(styrene-maleate disodium salt) copolymer, poly(acrylate, lithium salt-co-maleate, lithium salt), polystyrene-block-poly(ethylene-random-butylene)-block-poly(styrene-graft-maleate, lithium salt), fura-2 lithium salt, styrene-divinylbenzene copolymer functionalized with dilithium salt of iminodiacetic acid, styrene-divinylbenzene copolymer functionalized with disodium salt of iminodiacetic acid, and combinations thereof.

11. The lithium ion battery separator as defined in claim 9 wherein the one or more chelating agents are selected from the group consisting of poly(ethylene-alt-maleate), alkali metal salts of carboxymethylated chitosan, alkali metal salts of carboxyethylated chitosan, polyethyleneimine, alkali metal salts of carboxymethylated polyethyleneimine, alkali metal salts of carboxyethylated polyethyleneimine, lignin, and combinations thereof.

12. The lithium ion battery separator as defined in claim 9 wherein the one or more chelating agents are selected from the group consisting of poly(ethylene-alt-maleic acid dilithium salt), natural lignin, chemically modified lignin, and combinations thereof.

13. The lithium ion battery separator as defined in claim 9 wherein the one or more chelating agents are selected from the group consisting of poly(ethylene-alt-maleic acid dilithium salt), BPAP (bis-picolylamine functionalized polymer), tetrasodium salt of ethylenediamine tetraacetic acid (EDTANa$_4$), and combinations thereof.

14. A method, comprising:

selecting one or more chelating agents to complex with transition metal ions in a manner sufficient to not affect movement of lithium ions across a nanoporous or microporous polymer separator during operation of a lithium ion battery, wherein the lithium ion battery includes:

a positive electrode;

a negative electrode;

the nanoporous or microporous polymer separator soaked in an electrolyte solution, the nanoporous or microporous polymer separator operatively disposed between the positive electrode and the negative electrode; and the one or more chelating agents, wherein the one or more chelating agents are at least one of: dissolved or dispersed in the electrolyte solution; grafted onto the polymer of the nanoporous or microporous polymer separator as a substitute pendant group; attached to a binder material of the negative electrode; attached to a binder material of the positive electrode; disposed within pores of the separator; coated on a surface of the separator; coated on a surface of the negative electrode; and coated on a surface of the positive electrode;

wherein the one or more chelating agents are selected from: ion traps in molecular form selected from the group consisting of: polyamines, thiols, and alkali metal salts of organic acids; polymers functionalized with alkali metal salts of organic acids; polymers functionalized with nitrogen-containing functional groups; and polymers functionalized with two or more functional groups;

wherein the alkali metal salts of organic acids are multidentate structures selected from any of: tridentate structures selected from the group consisting of trisodium citrate, nitrilotriacetic acid trilithium salt (Li$_3$NTA), nitrilotriacetic acid trisodium salt (Na$_3$NTA), N-(2-carboxyethyl)iminodiacetic acid trilithium salt, trilithium 1,4,7-triazacyclononane-1,4,7-trisacetic acid salt (Li$_3$NOTA), and combinations thereof; tetradentate structures selected from the group consisting of tetralithium salt of 1,2-bis(o-aminophenoxy)ethane-N,N,N', N'-tetra acetic acid (Li$_4$BAPTA), tetralithium salt of 1,4,7,10-tetra aza cyclo dodecane-1,4,7,10-tetra acetic acid (Li$_4$DOTA), tetrasodium salt of ethylenediamine tetraacetic acid (EDTANa$_4$), ethyleneglycol-bis-(2-aminoethyl ether)-N, N, N', N'-tetra acetic acid tetralithium salt (Li$_4$EGTA), and combinations thereof; a pentadentate structure comprising pentetic acid pentalithium salt (Li$_5$DTPA); hexadentate structures selected from the group consisting of hexalithium gluconate, hexasodium gluconate, Li$_6$TMPA is tris(methylene phosphonic acid) hexalithium salt, and combinations thereof; and an octadentate structure comprising octalithium ethylene diamine tetramethyl phosphate (Li$_8$EDTMP);

wherein the polyamine is 2,2'-bis(salicylideneamino) azobenzene;

wherein the polymers functionalized with nitrogen-containing functional groups are selected from the group consisting of linear polyethyleneimine, branched polyethyleneimine, carboxyethylated polyethyleneimine, carboxymethylated polyethyleneimine, bis-picolylamine functionalized polymer, poly(amidoamine) dendrimer, and combinations thereof; and wherein the polymers functionalized with two or more functional groups are selected from the group consisting of carboxymethylated chitosan; carboxyethylated chitosan; poly(maleate, lithium salt-alternating-1-decene), 3-(dimethylamino)-1-propylamine; lignin, carboxymethylated lignin, carboxyethylated lignin, 2,3-dihydroxybenzoic acid, and combinations thereof.

15. The method as defined in claim 14 wherein the one or more chelating agents are selected from the group consisting of poly(ethylene-alt-maleate), alkali metal salts of carboxymethylated chitosan, alkali metal salts of carboxyethylated chitosan, polyethyleneimine, alkali metal salts of carboxymethylated polyethyleneimine, alkali metal salts of carboxyethylated polyethyleneimine, lignin, and combinations thereof.

16. The method as defined in claim 14 wherein the one or more chelating agents are selected from the group consisting of poly(ethylene-alt-maleic acid dilithium salt), natural lignin, chemically modified lignin, and combinations thereof.

17. The method as defined in claim 14 wherein the one or more chelating agents are selected from the group consisting of poly(ethylene-alt-maleic acid dilithium salt), BPAP (bis-picolylamine functionalized polymer), polyethyleneimine, and combinations thereof.

18. A lithium ion battery, comprising:
a positive electrode including a binder material;
a negative electrode including a binder material;
a nanoporous or microporous polymer separator soaked in an electrolyte solution, the nanoporous or microporous polymer separator operatively disposed between the positive electrode and the negative electrode; and
one or more chelating agents to complex with transition metal ions in a manner sufficient to not affect movement of lithium ions across the nanoporous or microporous polymer separator during operation of the lithium ion battery;
wherein the one or more chelating agents are at least one of: grafted onto the polymer of the nanoporous or microporous polymer separator as a substitute pendant group; attached to the binder material of the negative electrode; attached to the binder material of the positive electrode; coated on a surface of the separator; coated on a surface of the negative electrode; and coated on a surface of the positive electrode; and
wherein the one or more chelating agents are selected from: alkali metal salts of organic acids, polymers functionalized with alkali metal salts of organic acids; and combinations thereof.

19. The lithium ion battery as defined om claim 18 wherein the alkali metal salts of organic acids are multidentate structures selected from any of:
tridentate structures selected from the group consisting of trisodium citrate, nitrilotriacetic acid trilithium salt ($Li_3NTA$), nitrilotriacetic acid tri sodium salt ($Na_3NTA$), N-(2-carboxyethyl)iminodiacetic acid trilithium salt, trilithium 1,4,7-triazacyclononane-1,4,7-trisacetic acid salt ($Li_3NOTA$), and combinations thereof;
tetradentate structures selected from the group consisting of tetralithium salt of 1,2-bis(o-aminophenoxy)ethane-N,N,N',N'-tetra acetic acid ($Li_4BAPTA$), tetralithium salt of 1,4,7,10-tetra aza cyclo dodecane-1,4,7,10-tetra acetic acid ($Li_4DOTA$), tetralithium salt of ethylenediamine tetraacetic acid ($EDTALi_4$), tetrasodium salt of ethylenediamine tetraacetic acid ($EDTANa_4$), ethyleneglycol-bis-(2-aminoethyl ether)-N, N, N', N'-tetra acetic acid tetralithium salt ($Li_4EGTA$), and combinations thereof;
a pentadentate structure comprising pentetic acid pentalithium salt ($Li_5DTPA$) salt;
hexadentate structures selected from the group consisting of hexalithium gluconate, hexasodium gluconate, $Li_6TMPA$ is tris(methylene phosphonic acid) hexalithium salt, and combinations thereof; and
an octadentate structure comprising octalithium ethylene diamine tetramethyl phosphate ($Li_8EDTMP$).

20. The lithium ion battery as defined in claim 18 wherein the polymers functionalized with alkali metal salts of organic acids are selected from the group consisting of poly(ethylene-alt-maleic acid dilithium salt), poly(methyl vinyl ether-alternating-maleate, lithium salt), poly(ethylene-graft-maleate, lithium salt), poly(itaconate, lithium salt), copolymers of poly(itaconate, lithium salt), poly(isobutylene-alternating-maleate, lithium salt), poly(1-tetradecene-alternating-maleate, lithium salt), poly(1-octadecene-alternating-maleate, lithium salt), poly(styrene-maleate disodium salt) copolymer, poly(acrylate, lithium salt-co-maleate, lithium salt), polystyrene-block-poly(ethylene-random-butylene)-block-polystyrene-graft-maleate, lithium salt, fura-2 lithium salt, styrene-divinylbenzene copolymer functionalized with dilithium salt of iminodiacetic acid, styrene-divinylbenzene copolymer functionalized with disodium salt of iminodiacetic acid, and combinations thereof.

\* \* \* \* \*